US008226270B2

(12) United States Patent
Yamamoto et al.

(10) Patent No.: US 8,226,270 B2
(45) Date of Patent: Jul. 24, 2012

(54) LIGHTING DEVICE

(75) Inventors: Shoji Yamamoto, Osaka (JP); Hiroyasu Nakagawa, Osaka (JP); Shinya Sakaida, Osaka (JP); Fujio Takahashi, Osaka (JP); Ayanori Hamaguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 219 days.

(21) Appl. No.: 12/451,596

(22) PCT Filed: May 22, 2008

(86) PCT No.: PCT/JP2008/059418

§ 371 (c)(1), (2), (4) Date: Nov. 20, 2009

(87) PCT Pub. No.: WO2008/146694

PCT Pub. Date: Dec. 4, 2008

(65) Prior Publication Data

US 2010/0096992 A1 Apr. 22, 2010

(30) Foreign Application Priority Data

May 23, 2007 (JP) ................................ 2007-137069
Jun. 19, 2007 (JP) ................................ 2007-161815
Dec. 28, 2007 (JP) ................................ 2007-341209

(51) Int. Cl.

| | |
|---|---|
| ***F21V 29/00*** | (2006.01) |
| ***F21V 15/00*** | (2006.01) |
| ***B60Q 3/04*** | (2006.01) |
| ***H01R 33/00*** | (2006.01) |

(52) U.S. Cl. ........................ 362/294; 362/362; 362/650

(58) Field of Classification Search ................. 315/112; 313/46; 362/6, 92, 126, 294
See application file for complete search history.

(56) References Cited

U.S. PATENT DOCUMENTS

| | | | | |
|---|---|---|---|---|
| 6,948,829 | B2 | 9/2005 | Verdes et al. | |
| 7,674,015 | B2 * | 3/2010 | Chien | 362/294 |
| 2004/0066142 | A1 | 4/2004 | Stimac et al. | |
| 2005/0024864 | A1 | 2/2005 | Galli | |
| 2006/0227558 | A1 * | 10/2006 | Osawa et al. | 362/351 |

FOREIGN PATENT DOCUMENTS

| | | | |
|---|---|---|---|
| JP | 63-84967 | U | 6/1988 |
| JP | 4-47467 | B2 | 8/1992 |
| JP | 6-86359 | U | 12/1994 |
| JP | 07-085708 | | 3/1995 |

(Continued)

OTHER PUBLICATIONS

Extended European search report in European Application No. 08764491.0 mailed Apr. 14, 2011.

(Continued)

*Primary Examiner* — Jacob Y Choi
*Assistant Examiner* — Henry Luong
(74) *Attorney, Agent, or Firm* — Birch, Stewart, Kolasch & Birch, LLP

(57) ABSTRACT

The lighting device includes: a heat radiating part provided with a cavity that accommodates a part of a plurality of drive circuit components driving a light source module; and a base part provided with a cavity that accommodates another part (e.g., a transistor) of the drive circuit components. Then, the drive circuit components are accommodated in the cavity of the heat radiating part and the cavity of the base part.

12 Claims, 24 Drawing Sheets

FOREIGN PATENT DOCUMENTS

| | | | |
|---|---|---|---|
| JP | 11-260125 | | 9/1999 |
| JP | 2001-243807 | A | 9/2001 |
| JP | 2002-106530 | A | 4/2002 |
| JP | 2002-343104 | A | 11/2002 |
| JP | 2003-151306 | A | 5/2003 |
| JP | 2005-93097 | A | 4/2005 |
| JP | 2005-513815 | A | 5/2005 |
| JP | 2005-216495 | A | 8/2005 |
| JP | 2005-235778 | | 9/2005 |
| JP | 2005-251637 | A | 9/2005 |
| JP | 2005-286267 | A | 10/2005 |
| JP | 2006-502551 | A | 1/2006 |
| JP | 2006-40727 | A | 2/2006 |
| JP | D-1284116 | | 10/2006 |
| JP | 2006-313717 | A | 11/2006 |
| JP | 2007-48728 | A | 2/2007 |

OTHER PUBLICATIONS

JP Office Action dated Sep. 6, 2011, issued in corresponding JP Application No. 2007-161815.

JP Office Action issued in co-pending JP application No. 2007-137069 dated Nov. 29, 2011.

* cited by examiner

LIGHTING DEVICE (*US only) This application is the national phase under 35 U.S.C. §371 of PCT International Application No. PCT/JP2008/59418 which has an International filing date of May 22, 2008 and designated the United States of America.

BACKGROUND

1. Technical Field

The present invention relates to a lighting device provided with a light emitting diode (referred to as an LED, hereinafter) and a drive circuit section driving the LED.

2. Description of Related Art

Recently, a large number of lighting devices in which LEDs having the features of small size, power saving, and long life are applied to lighting are under development. In association with such application of LEDs to lighting, various kinds of techniques are proposed in the field of lighting.

For example, Japanese Patent Application Laid-Open No. 2001-243807 discloses an LED bulb in which the external appearance of a conventional incandescent bulb is maintained intact, that is, an LED is provided inside a so-called globe so that compatibility with the conventional incandescent bulb is improved.

Japanese Patent Application Laid-Open No. 2005-216495 discloses an LED unit with a base in which an LED and a power supply circuit converting an input voltage into a voltage for LED are accommodated in separate cases respectively so that a situation is avoided that the light output of the LED is reduced owing to heat generated by the power supply circuit.

On the other hand, in order to achieve a higher luminance in the lighting employing LEDs, LEDs need to be accumulated at high densities. As such, when LEDs are accumulated at high densities, a problem arises that heat generated by the LEDs themselves causes damage and degradation in the LEDs themselves and the board on which the LEDs are mounted. Nevertheless, in the LED bulb described in Japanese Patent Application Laid-Open No. 2001-243807 and the LED unit with base described in Japanese Patent Application Laid-Open No. 2005-216495, design consideration for resolving such a problem caused by heat generated by the LED is insufficient.

Further, Japanese Design Registration No. 1284116 discloses a design of a light emitting diode lamp having an LED and a heat sink in which a recess accommodating a power supply circuit is provided in the heat sink in a manner of communication with the outside.

SUMMARY

The LED bulb and the LED unit with base described in the above-mentioned Japanese Patent Application Laid-Open No. 2001-243807 and Japanese Patent Application Laid-Open No. 2005-216495 constitute a part of the prior art concerning a lighting device employing an LED as a light source, but do not resolve the problem caused by heat generated by the LED. When an LED is to be employed as the light source of a lighting device, a large number of LEDs are necessary for ensuring a sufficient luminance. Thus, a structure is necessary for radiating the heat from the LEDs. Nevertheless, in the prior art described in the above-mentioned Japanese Patent Application Laid-Open No. 2001-243807 and Japanese Patent Application Laid-Open No. 2005-216495, design consideration for resolving such a problem caused by heat generated by the LEDs is insufficient.

Further, the light emitting diode lamp disclosed in Japanese Design Registration No. 1284116 has a structure that an LED is provided on a heat sink so that heat from the LED is radiated through the heat sink. Nevertheless, the ratio of the volume occupied by the heat sink to the overall volume of the lighting device is extremely high. This causes size increase in the lighting device and, in some cases, impairs the external appearance of the lighting device. Further, the recess provided in the heat sink and accommodating the power supply circuit is in communication with the outside. Thus, when the lighting device is used for a long time, dust, particulates, or the like enter the recess from the outside and go into contact with the power supply circuit so as to cause ignition or a fault in some cases. Further, the recess is provided merely in a small volume inside the heat sink. This causes a problem that a sufficient space is not ensured for adapting an increase in the number or the size of circuit components caused in association with an increase in the power consumption of the lighting device.

The present invention has been devised in view of such situations. An object thereof is to provide a lighting device in which a structure for radiating heat from the LED is provided under the condition that arrangement of a drive circuit section driving an LED is optimized so that size increase in the lighting device is prevented. Another object is to provide a lighting device capable of preventing a situation that dust, particulates, or the like go into contact with the drive circuit section so as to cause ignition or a fault.

The lighting device according to the present invention is a lighting device provided with an LED, a drive circuit section driving the LED, and an accommodating part accommodating the drive circuit section, comprising a heat radiating part radiating heat from the LED and/or the drive circuit section, wherein the accommodating part is tightly closed by using at least a part of the heat radiating part.

In the present invention, under the condition that size increase in the lighting device is prevented, heat radiation from the LED is achieved effectively. Further, occurrence of ignition or a fault is avoided that may be caused when the drive circuit section driving the LED goes into contact with dust, particulates, or the like.

The lighting device according to the present invention is a lighting device provided with an LED, a drive circuit section driving the LED, and an accommodating part accommodating the drive circuit section, comprising a heat radiating part radiating heat from the LED and/or the drive circuit section, wherein the accommodating part is formed inside the heat radiating part such as to be close to a surface on which the LED is provided.

In the present invention, under the condition that size increase in the lighting device is prevented, heat radiation from the LED is achieved effectively. In particular, since the accommodating part extends to a position close to the surface on which the LED is provided, a sufficient space is ensured for the accommodating part, while size reduction in the lighting device is achieved. Further, even when the power consumption increases so that a larger drive circuit section is required, size increase in the lighting device is prevented. This also contributes to radiation of the heat from the drive circuit section.

The lighting device according to the present invention is characterized by further comprising: a base part connected to a power supply part; and an insulating part insulating the heat radiating part from the base part, wherein the accommodating part is formed by the heat radiating part and the insulating part.

In the present invention, the accommodating part is formed as a combination of separate components consisting of the heat radiating part and to the insulating part. This allows the drive circuit section to be accommodated easily into the accommodating part.

The lighting device according to the present invention is characterized in that the heat radiating part comprises: a heat radiation plate having one surface where the LED is mounted; a fixed cylinder attached to the other surface of the heat radiation plate and provided with the accommodating part in an inside thereof; and a heat radiation fin fixed to an outer side of the fixed cylinder.

In the present invention, the LED is attached to the one surface of the heat radiation plate, while the fixed cylinder is attached to the other surface. Then, a part of the drive circuit components is accommodated in the cavity inside the fixed cylinder. The plurality of heat radiation fins are fixed on the outer side of the fixed cylinder, so that the heat generated by the LED is conducted to the heat radiation fins via the heat radiation plate and then released to outside air via the surfaces of the heat radiation fins.

The lighting device according to the present invention is characterized in that the accommodating part forms a closed space where dust entering from the outside is shut off.

In the present invention, the accommodating part is constructed such as to form a closed space where dust entering from the outside is shut off. This prevents dust, particles, or the like from being accumulated in the accommodating part.

The lighting device according to the present invention is characterized in that the insulating part includes an attaching part to be attached to the heat radiating part, and is attached to the heat radiating part by the attaching part, thereby shielding the drive circuit section and the heat radiating part from each other so as to ensure insulation.

In the present invention, the insulating part includes the attaching part to be attached to the heat radiating part, and then the insulating part is attached to the heat radiating part by the attaching part. This allows the insulating part to be fixed to the heat radiating part more reliably. When the insulating part is attached to the heat radiating part, the drive circuit section accommodated inside the accommodating part formed by the insulating part and the heat radiating part is shielded from the heat radiating part by the insulating part. This avoids a situation that dust, particulates, or the like enter the accommodating part from the outside, and then go into contact with the drive circuit section so as to cause ignition or a fault. Furthermore, insulation is ensured between the drive circuit section and the heat radiating part.

The lighting device according to the present invention is characterized in that the attaching part is formed by a notch provided in the insulating part, and the insulating part includes a prevention part for preventing a non-insulation state between the drive circuit section and the heat radiating part caused by the notch.

In the present invention, since the attaching part is formed by the notch, elasticity is given to the attaching part. This allows the insulating part to be attached easily to the heat radiating part. Further, the prevention part is provided for preventing a non-insulation state between the drive circuit section and the heat radiating part which may occur when the notch is provided. Thus, insulation is ensured between the drive circuit section and the heat radiating part.

According to the present invention, under the condition that size increase in the lighting device is prevented, heat radiation from the LED is achieved effectively. Further, occurrence of ignition or a fault is avoided that may be caused when the drive circuit section driving the LED goes into contact with dust, particulates, or the like.

The above and further objects and features will more fully be apparent from the following detailed description with accompanying drawings.

DETAILED DESCRIPTION

Embodiment 1

Figure 1:
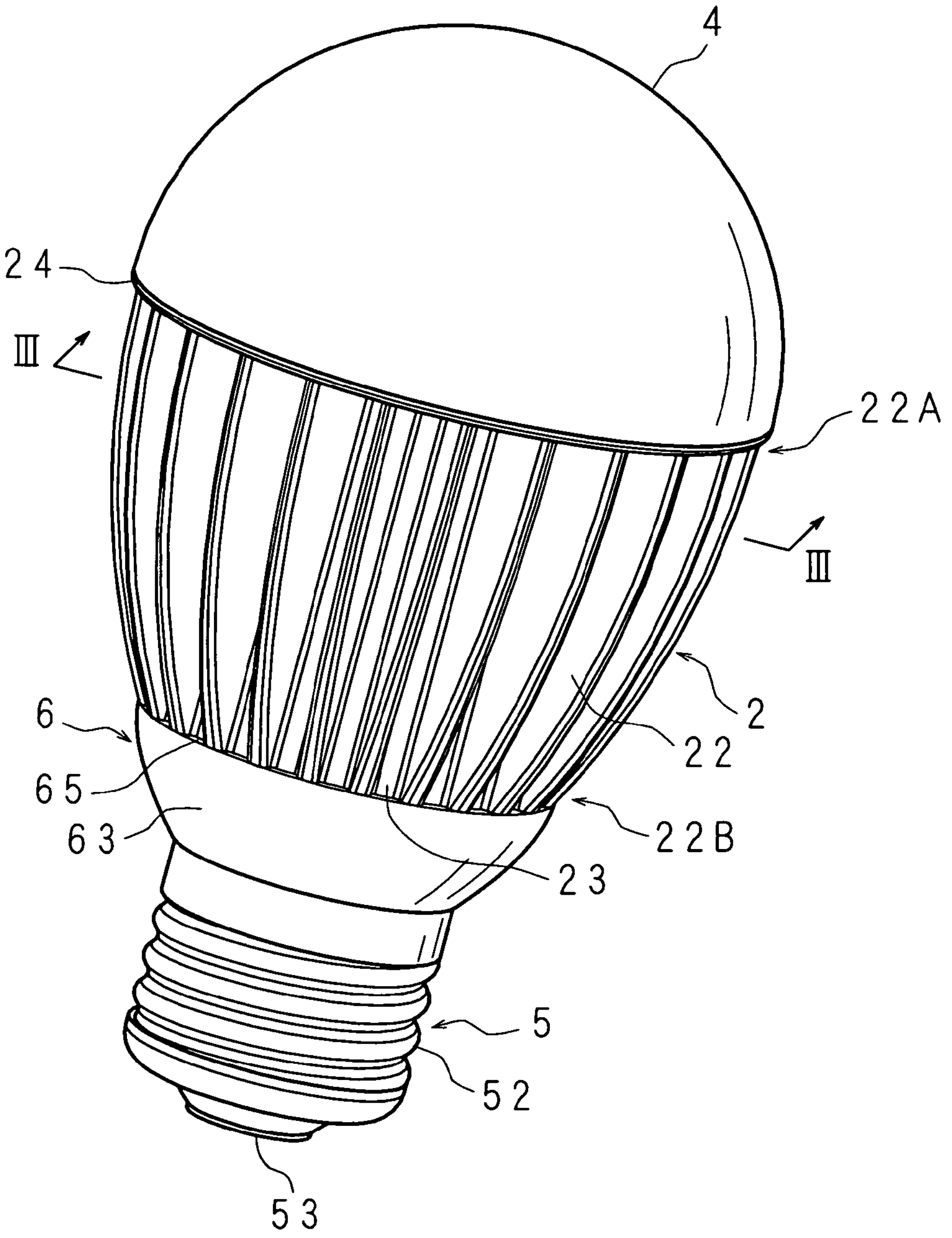
FIG. 1 is a perspective view illustrating a configuration of a lighting device according to Embodiment 1 of the present invention.
Figure 2:
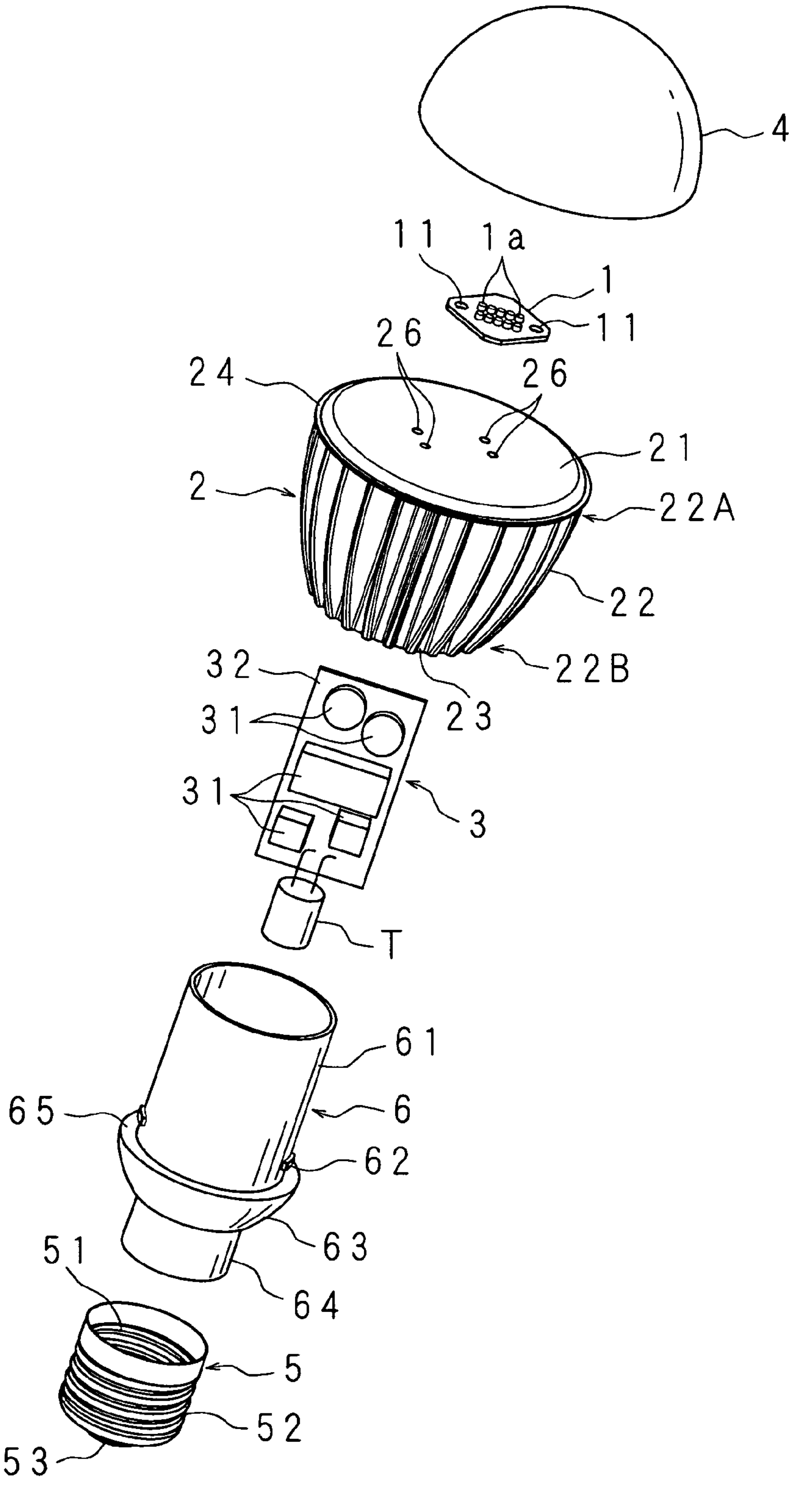
FIG. 2 is an exploded perspective view of a main part, illustrating a configuration of the lighting device according to Embodiment 1 of the present invention.
Figure 3:
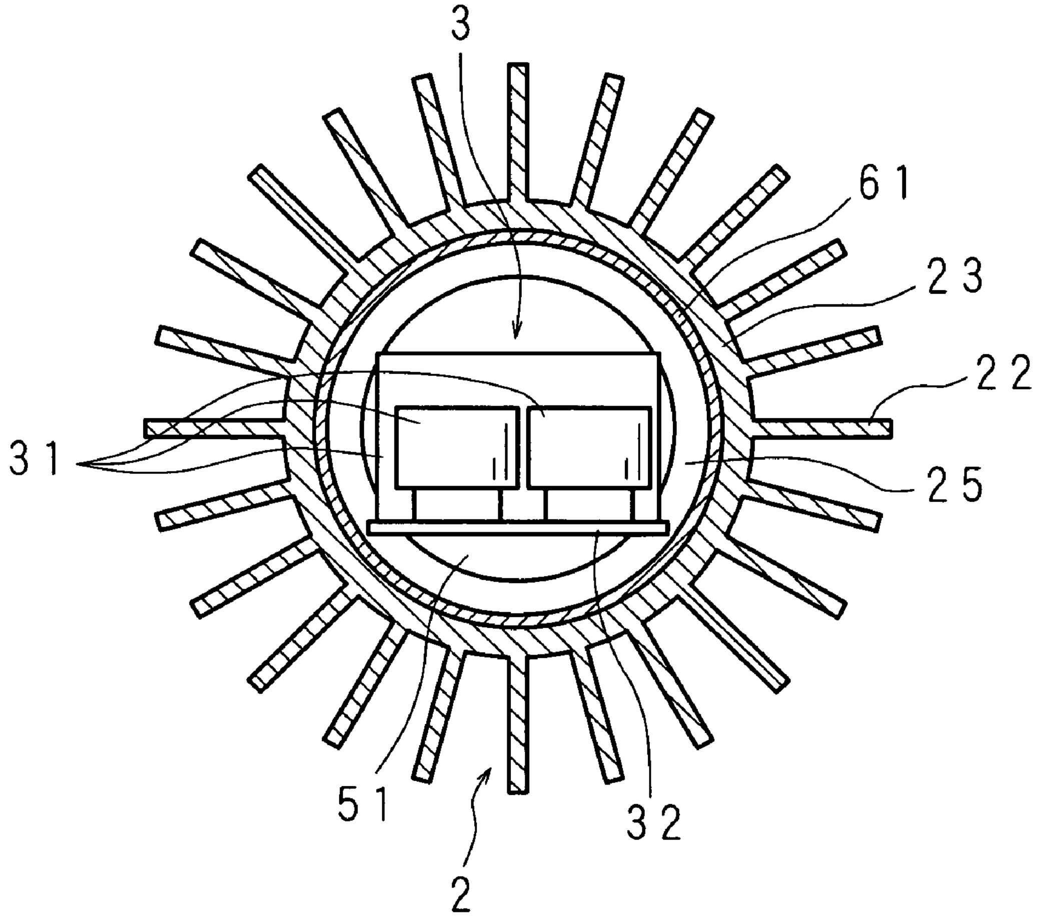
FIG. 3 is a schematic transverse sectional view of a main part taken along a line III-III in FIG. 1.
Figure 4:
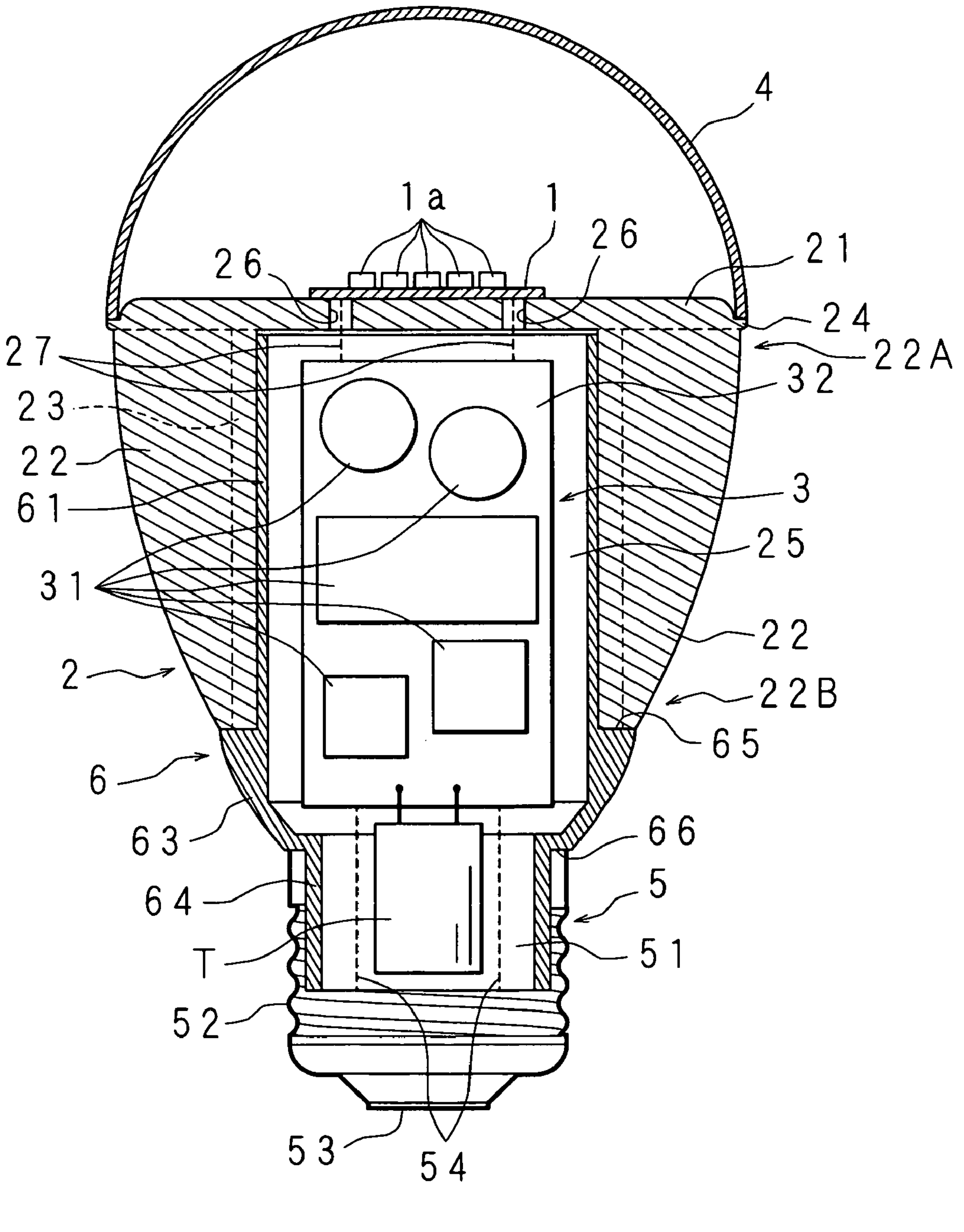
FIG. 4 is a schematic longitudinal sectional view of a main part, illustrating a configuration of the lighting device according to Embodiment 1 of the present invention.

Embodiment 1 of the present invention is described below with reference to drawings. FIG. 1 is a perspective view illustrating a configuration of a lighting device according to Embodiment 1 of the present invention. FIG. 2 is an exploded perspective view of a main part. FIG. 3 is a schematic transverse sectional view of a main part taken along a line III-III in FIG. 1. FIG. 4 is a schematic longitudinal sectional view of a main part, illustrating a configuration of the lighting device according to Embodiment 1 of the present invention.

The lighting device according to Embodiment 1 has: a light source module 1 in which a plurality of white LEDs 1*a* are mounted; a dome-shaped light-transmitting part 4 covering the light source module 1; a heat radiating part 2 for radiating heat generated by the light source module 1; a drive circuit section 3 (drive section) provided with a plurality of drive circuit components 31, 31, 31, . . . for driving the light source module 1; a cylindrical base part 5 electrically connected to the drive circuit section 3 and connected to an external power supply; and an insulating part 6 located between the base part 5 and the heat radiating part 2.

The light source module 1 is constructed such that the plurality of LEDs (small chips) 1*a* of 0.1 W are densely mounted in the center part on a rectangular ceramic board. Through holes 11 and 11 used for screwing the light source module 1 onto the heat radiating part 2 are provided at any two vertices opposite to each other in the light source module 1. The light source module 1 is screwed onto a later-described heat radiation plate 21 of the heat radiating part 2, with a heat conduction sheet (not illustrated) therebetween.

The heat radiating part 2 has a disk-shaped heat radiation plate 21. Then, the light source module 1 is screwed in the center part of one surface of the heat radiation plate 21. On the edge of the heat radiation plate 21, a flange 24 abutting against the edge of the light-transmitting part 4 is formed in the periphery. In the center part of the other surface of the heat radiation plate 21, a fixed cylinder 23 protrudes for fixing later-described heat radiation fins 22. In the inside of the fixed cylinder 23, a cavity 25 is formed that serves as an accommodating part accommodating a part of the drive circuit components 31, 31, 31, . . . of the drive circuit section 3.

From the perspective of size reduction in the lighting device, it is preferable that the cavity 25 serving as the accommodating part for the drive circuit section 3 extends to a position close to the surface on which the light source module 1 is provided, so that the drive circuit section 3 is allowed to be accommodated in the inside to a maximum extent. Further, since a sufficient space is ensured, even when size increase in the drive circuit section 3 is caused in association with an increase in the power consumption of the lighting device, size increase in the lighting device is prevented. Further, although the heat from the drive circuit section 3 stays in the cavity 25, temperature increase is prevented more in a larger cavity.

Further, the heat radiating part 2 radiates not only the heat from the light source module 1 having the plurality of LEDs 1*a* but also the heat from the drive circuit section 3.

Through holes 26, 26, 26, and 26 are provided in the center part of the heat radiation plate 21. Lead wires (indicated by dash-dotted lines in the FIGS. 27 and 27 connecting to each other the drive circuit section 3 and the light source module 1 accommodated in the cavity 25 penetrate the through holes 26, 26, 26, and 26. On the outer peripheral surface of the fixed cylinder 23, a plurality of heat radiation fins 22, 22, 22, . . . elongated in the axial length direction of the fixed cylinder 23 are provided in parallel to each other in the circumferential direction of the fixed cylinder 23. The heat radiation fins 22, 22, 22, . . . are fixed to the outer peripheral surface of the fixed cylinder 23. Then, one end 22A thereof is fixed to the other surface of the heat radiation plate 21. The dimension measured from the outer peripheral surface of the fixed cylinder 23 to the edge of the heat radiation fin 22 decreases from the one end 22A on the heat radiation plate 21 side toward the other end 22B. The heat radiation plate 21, the fixed cylinder 23, and the heat radiation fins 22, 22, 22, . . . are made of aluminum and formed as a unit. The insulating part 6 is attached to the other end 22B side of the heat radiation fins 22, 22, 22, . . . .

Since the heat radiating part 2 has the above-mentioned configuration, the heat generated by the light source module 1 is conducted through the heat radiation plate 21 and the heat radiation fins 22, 22, 22, . . . , and then released to outside air via the surfaces of the heat radiation fins 22, 22, 22, . . . .

Further, the light source module 1 is provided on the one end 22A side of the heat radiation fins 22, 22, 22, . . . via the heat radiation plate 21, while the insulating part 6 is provided on the other end 22B side. Further, the base part 5 is fixed to the insulating part 6. Thus, when the lighting device according to Embodiment 1 is used in a ceiling or the like, the light source module 1 at high temperatures is located under the base part 5 at low temperatures. Thus, the flow of outside air is guided in a direction from the light source module 1 to the base part 5.

The light-transmitting part 4 covers and protects the light source module 1, and allows light from the light source module 1 to go through. The light-transmitting part 4 is made of opaque white polycarbonate resin having a satisfactory shock resistance and heat resistance. The light-transmitting part 4 is fixes to the heat radiating part 2 in a state that the edge abuts against the flange 24 of the heat radiation plate 21.

The insulating part 6 has: a heat radiating part holding cylinder 61 holding the heat radiating part 2; a linkage part 63 provided continuously to one end of the heat radiating part holding cylinder 61 so as to link the heat radiating part holding cylinder 61 with a later-described base part holding cylinder 64; and a base part holding cylinder 64 holding the base part 5. The insulating part 6 is fixed to the heat radiating part 2 in a state that the heat radiating part holding cylinder 61 is inserted into the fixed cylinder 23 of the heat radiating part 2.

Thus, the heat radiating part 2 and the insulating part 6 form a tightly closed cavity (accommodating part) for accommodating the drive circuit section 3. This avoids a situation that dust, particulates, or the like enter the cavity from the outside, and then go into contact with the drive circuit section 3 so as to cause ignition or a fault. Accordingly, this configuration is preferable from the perspective of safety and maintenance easiness in the lighting device.

The heat radiating part holding cylinder 61 has an axial-directional length approximately equal to that of the fixed cylinder 23 and an outer diameter somewhat smaller than the inner diameter of the fixed cylinder 23, is inserted into the fixed cylinder 23, and is fitted and secured on the fixed cylinder 23. Further, in one end part on the linkage part 63 side of the heat radiating part holding cylinder 61, protrusions 62 and 62 (attaching part) are provided for locking the insulating part 6 to the heat radiating part 2. In the inside of the fixed cylinder 23, recesses (not illustrated) corresponding to the protrusions 62 and 62 are provided so that by virtue of the operation of the recesses and the protrusions 62 and 62, the insulating part 6 is locked and fixed to the heat radiating part 2.

The linkage part 63 has a funnel shape, and is provided continuously such that on the edge of one end part on the heat radiating part holding cylinder 61 side, the inner peripheral surface is flush with the inner peripheral surface of the heat radiating part holding cylinder 61. The base part holding cylinder 64 is provided continuously to the other end part of the linkage part 63. The diameter decreases from the one end part toward the other end part. The edge of the one end part of the linkage part 63 has a flat holding surface 65 abutting against the other end of the heat radiating part 2. On the other hand, the edge of the other end part of the linkage part 63 has a flat holding surface 66 abutting against the edge of the base part 5.

The base part holding cylinder 64 is provided continuously to the linkage part 63 on the edge of the other end part, and has an axial-directional length shorter than that of the base part 5 and an outer diameter somewhat smaller than the inner diameter of the base part 5. The base part holding cylinder 64 is inserted into the base part 5, and is fitted and secured on the base part 5.

The heat radiating part holding cylinder 61, the linkage part 63, and the base part holding cylinder 64 are made of plastics and formed as a unit. Further, the heat radiating part holding cylinder 61, the linkage part 63, and the base part holding cylinder 64 are provided concentrically.

The base part 5 has the cavity 51 in the inside. One-end side thereof is open, and the other-end side thereof has a bottom. Further, the base part 5 is fixed to the insulating part 6 in a state that the edge on the one-end side abuts against the holding surface 66 of the linkage part 63 of the insulating part 6. The outer peripheral surface of the base part 5 is provided with a screw groove for being screwed into an electric bulb socket. The outer peripheral surface of the base part 5 serves as a one-pole terminal 52. Further, the bottom of the base part 5 has an other-pole terminal 53 protruding such as to be insulated from the one-pole terminal 52 of the outer peripheral surface. The other-pole terminal 53 and the one-pole terminal 52 are electrically connected to the drive circuit section 3 through lead wires (indicated by dash-dotted lines in the FIGS. 54 and 54.

The drive circuit section 3 is constructed such that the plurality of drive circuit components 31, 31, 31, . . . are mounted on a rectangular circuit board 32. The circuit board 32 has: a width greater than the inner diameter of the base part holding cylinder 64 and smaller than the inner diameter of the heat radiating part holding cylinder 61; and an appropriate length that permits accommodation into the insulating part 6. A part of the drive circuit components, for example, a transistor T, is connected to the circuit board 32 through long lead wires, and hence may be arranged at a position separated from the circuit board 32.

As described above, the heat radiating part holding cylinder 61 of the insulating part 6 is inserted into the cavity 25 of the fixed cylinder 23 of the heat radiating part 2, while the base part holding cylinder 64 of the insulating part 6 is inserted into the cavity 51 of the base part 5. Further, the cavity 25 of the fixed cylinder 23 of the heat radiating part 2 and the cavity 51 of the base part 5 are communicated with each other via the insulating part 6. Thus, the drive circuit section 3 is accommodated inside the heat radiating part holding cylinder 61 within the cavity 25 of the heat radiating part 2, while the transistor T is accommodated inside the base part holding cylinder 64 within the cavity 51 of the base part 5.

Embodiment 1 described above has been explained for a case that a part of the drive circuit components 31, 31, 31, . . . are accommodated in the cavity 25 of the heat radiating part 2 while another part (the transistor T) is accommodated in the cavity 51 of the base part 5. However, actual implementation is not limited to this. That is, when the situation allows, the entirety may be accommodated in the cavity 25 of the heat radiating part 2. In conclusion, when the cavity 25 serving as the accommodating part for the drive circuit section 3 is tightly closed by using at least a part of the heat radiating part 2, the drive circuit section 3 is accommodated inside the heat radiating part 2, and further the heat from the drive circuit section 3 is radiated.

Embodiment 2

Figure 5:
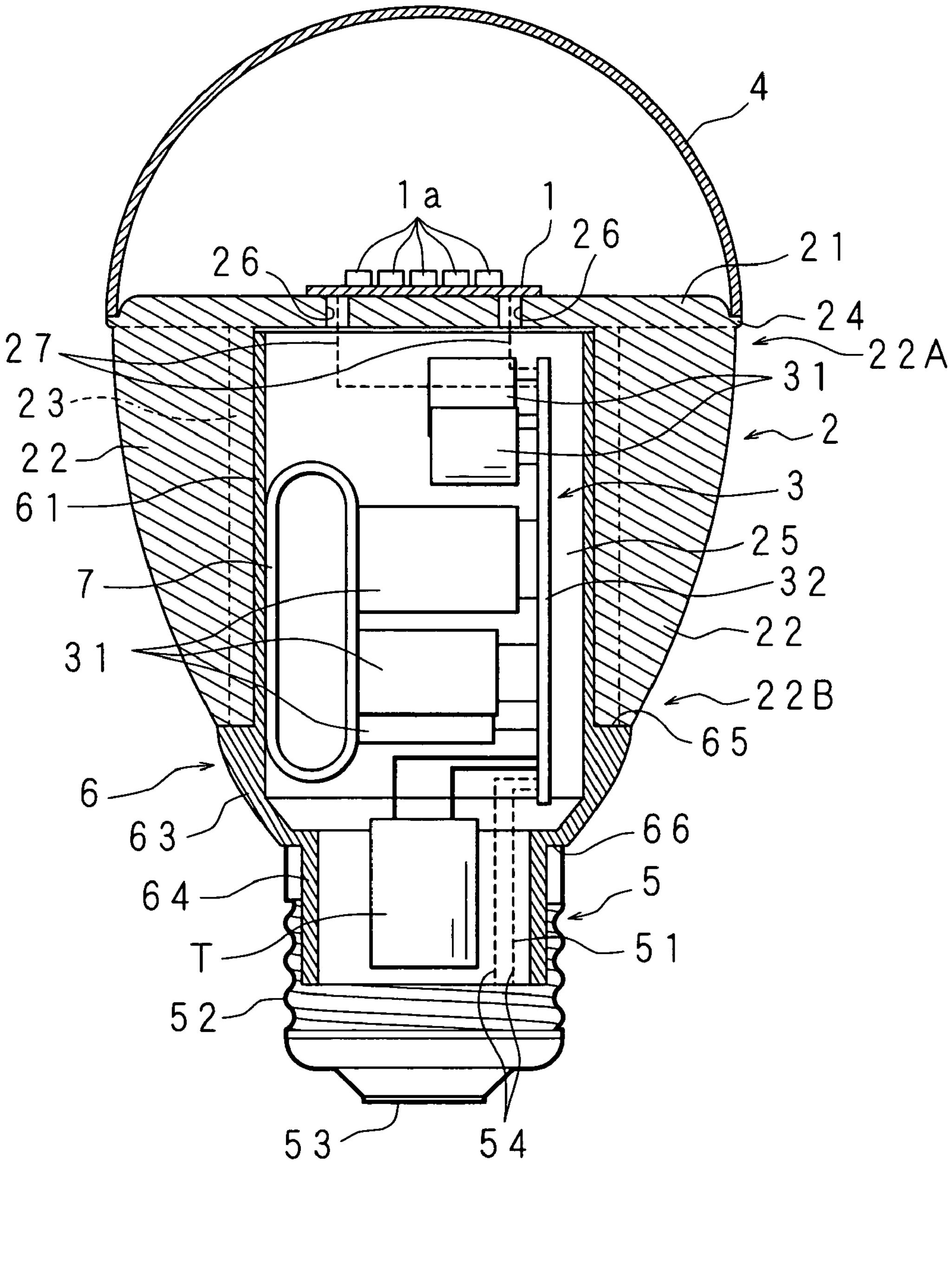
FIG. 5 is a schematic longitudinal sectional view of a main part, illustrating a configuration of a lighting device according to Embodiment 2 of the present invention.

FIG. 5 is a schematic longitudinal sectional view of a main part, illustrating a configuration of a lighting device according to Embodiment 2 of the present invention. Here, like parts to those of Embodiment 1 are designated by like numerals, and their detailed description is omitted.

The lighting device according to Embodiment 2 has a heat conduction sheet 7 conducting to the heat radiating part 2 the heat generated by the driving circuit components 31, 31, 31, . . . of the drive circuit section 3. The heat conduction sheet 7 is rolled into a ring shape, and is sandwiched between the drive circuit components 31, 31, 31, . . . and the inner peripheral surface of the fixed cylinder 23 of the heat radiating part 2. That is, one side of the heat conduction sheet 7 is in contact with the drive circuit components 31, 31, 31, . . . , while the other side is in contact with the inner peripheral surface of the fixed cylinder 23 of the heat radiating part 2 via the heat radiating part holding cylinder 61 of the insulating part 6. Thus, the heat generated by the driving circuit components 31, 31, 31, . . . is conducted through the heat conduction sheet 7 and the insulating part 6 to the fixed cylinder 23 and the heat radiation fins 22, 22, 22, . . . of the heat radiating part 2, and then released to outside air via the surfaces of the heat radiation fins 22, 22, 22, . . . .

On the other hand, in Embodiments 1 and 2, the area (referred to as a heat radiation area, hereinafter) necessary for the heat radiating part 2 to radiate to outside air the heat generated by the light source module 1 varies depending on the luminance of the lighting device. That is, the amount of heat generation increases with increasing luminance, and so does the necessary heat radiation area. Thus, in the lighting device of the embodiments described above, it is preferable that the shape and the number of heat radiation fins are designed such that the heat radiating part satisfies the following conditions. For the purpose of more appropriate heat radiation and size reduction in the lighting device, such a necessary heat radiation area was calculated by simulation. The simulation was performed by using "ANSYS Simulation 9.0" under the condition of ambient temperature of 40° C. The object was to control the temperature rise into a value lower than 40° C. The detailed conditions are as follows.

An adopted condition was that a plurality of LEDs were mounted and that each LED chip having a heat generation of $8.65\times10^6$ W/m$^3$ and a thickness of 1 mm was fixed on the front side of a rectangular aluminum board, with a heat conduction sheet (having a thermal conductivity of 5.0 W/m·K) having a thickness of 1 mm therebetween. The aluminum board had a thermal conductivity of 237 W/m·K, a thickness of 1 mm, and an area of 112 mm×112 mm. Air cooling alone by outside air (whose heat transfer coefficient was 5.8 W/m$^2$·K) was assumed to be performed. Here, the air cooling was assumed to be performed only from the back surface of the aluminum board.

As a result of simulation performed under the conditions described above, a necessary heat radiation area, that is, a necessary back surface area of the aluminum board, of 12500 mm$^2$ was concluded for the lighting device of type 20. Further, 25000 mm$^2$ for type 40 and 37500 mm$^2$ for type 60 were concluded. In other words, in order that the heat radiating part 2 performs air cooling by using outside air so as to control the temperature rise into a value lower than 40° C., the necessary area through which the heat radiation fins 22, 22, 22, . . . and the fixed cylinder 23 perform air cooling by means of contact with outside air is 12500 mm$^2$ for type 20, 25000 mm$^2$ for type 40, and 37500 mm$^2$ for type 60. However, in actual implementation, consideration needs to be made for the facts that the air cooling is not performed through a flat surface but is performed through the fixed cylinder 23 and the surfaces of the heat radiation fins 22, 22, 22, . . . arranged radially in parallel to each other in the outer peripheral surface of the fixed cylinder 23 and that these components are installed in an accommodating member such as a given case and a given cover such as not to impair the external appearance of the lighting device. Thus, for example, in the case of type 20, a heat radiation area of approximately 20000 mm$^2$ is preferable which is larger than 12500 mm$^2$ by 60%.

Embodiments 1 and 2 described above have been explained for a case that LEDs are employed as the light source. However, actual implementation is not limited to this. That is, EL (Electro Luminescence) devices may be employed. This heat radiating part accommodates the drive circuit section in the inside so as to achieve size reduction, and further radiates the heat from the light source and the drive circuit section. Thus, the heat radiating part may be applied to other light sources in a wide variety.

In the lighting device according to Embodiments 1 and 2, the protrusions provided in the insulating part are locked to the recesses provided in the heat radiating part, so that the insulating part is fixed to the heat radiating part. Another implementation example of a lighting device is described below in which a situation is avoided that dust, particulates, or the like from the outside enter an accommodating part formed by an insulating part and a heat radiating part and accommodating a drive circuit section, and then go into contact with the drive circuit section so as to cause ignition or a fault and in which insulation is ensured between the heat radiating part and the drive circuit section, and further the insulating part is reliably fixed to the heat radiating part.

Embodiment 3

Embodiment 3 of the present invention is described below with reference to FIGS. 6 to 10.

Figure 6:
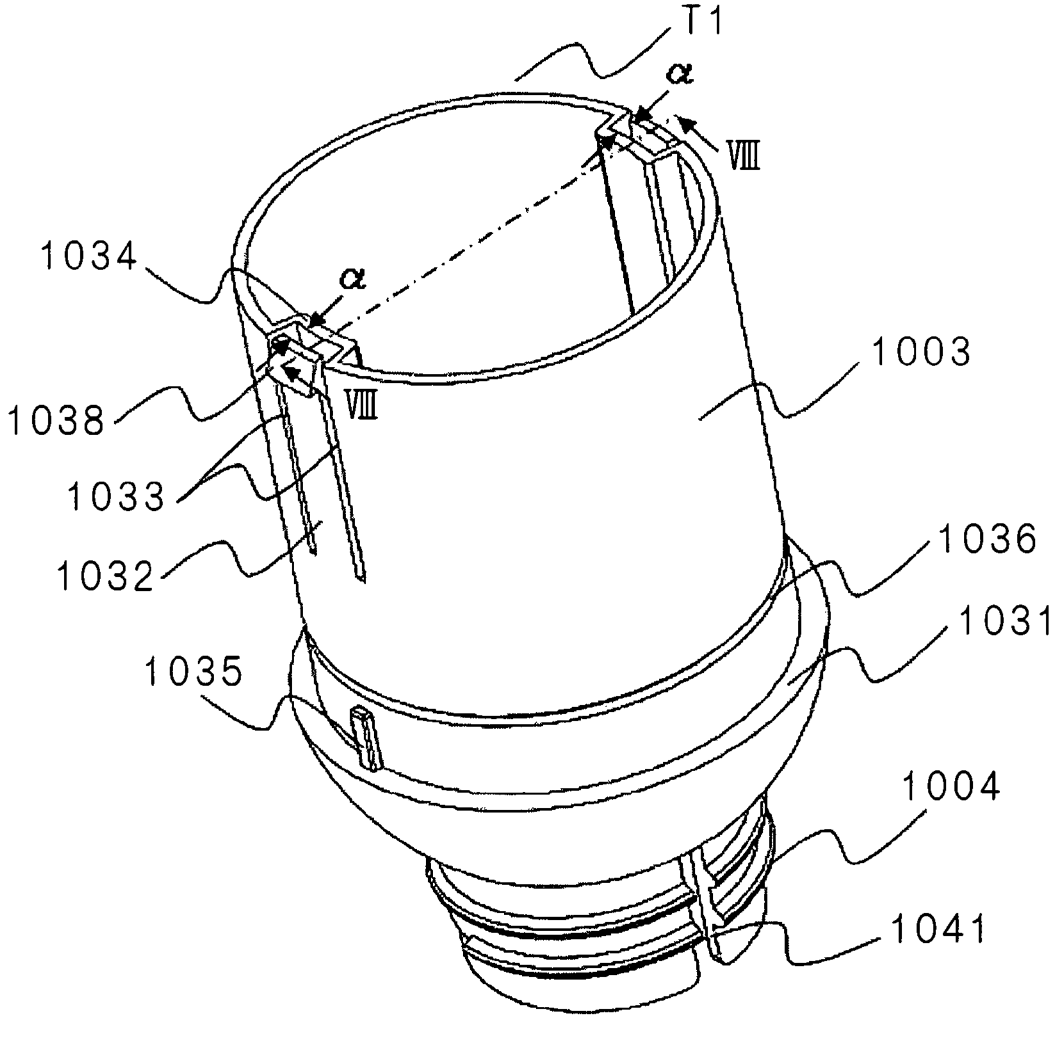
FIG. 6 is a perspective view of an attachment body of a lighting device according to Embodiment 3 of the present invention.
Figure 7:
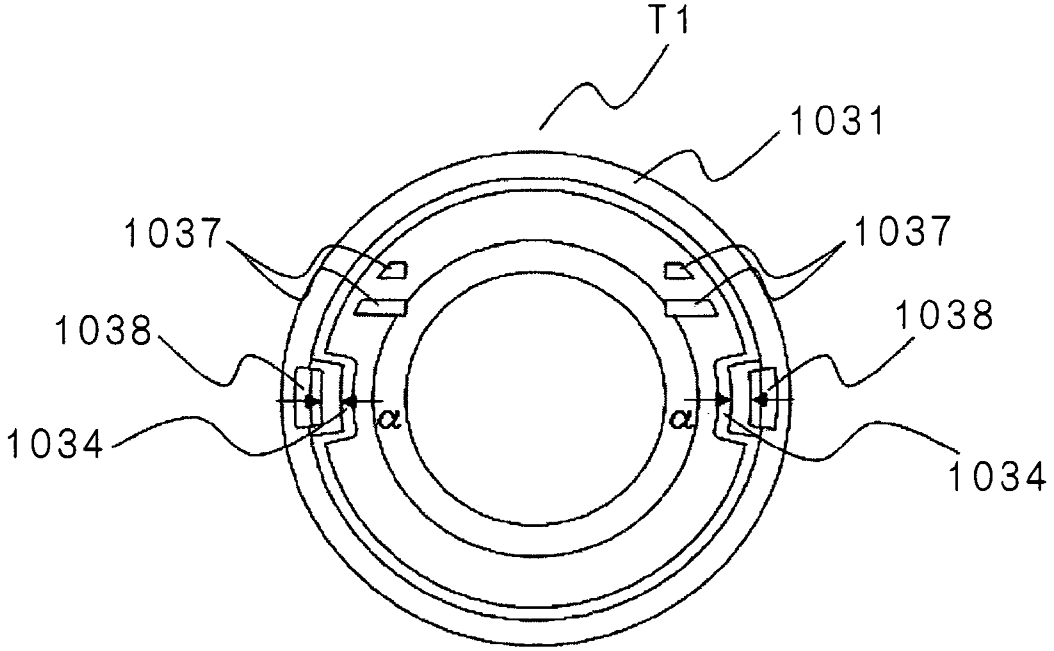
FIG. 7 is a top view of the attachment body in FIG. 6.
Figure 8:
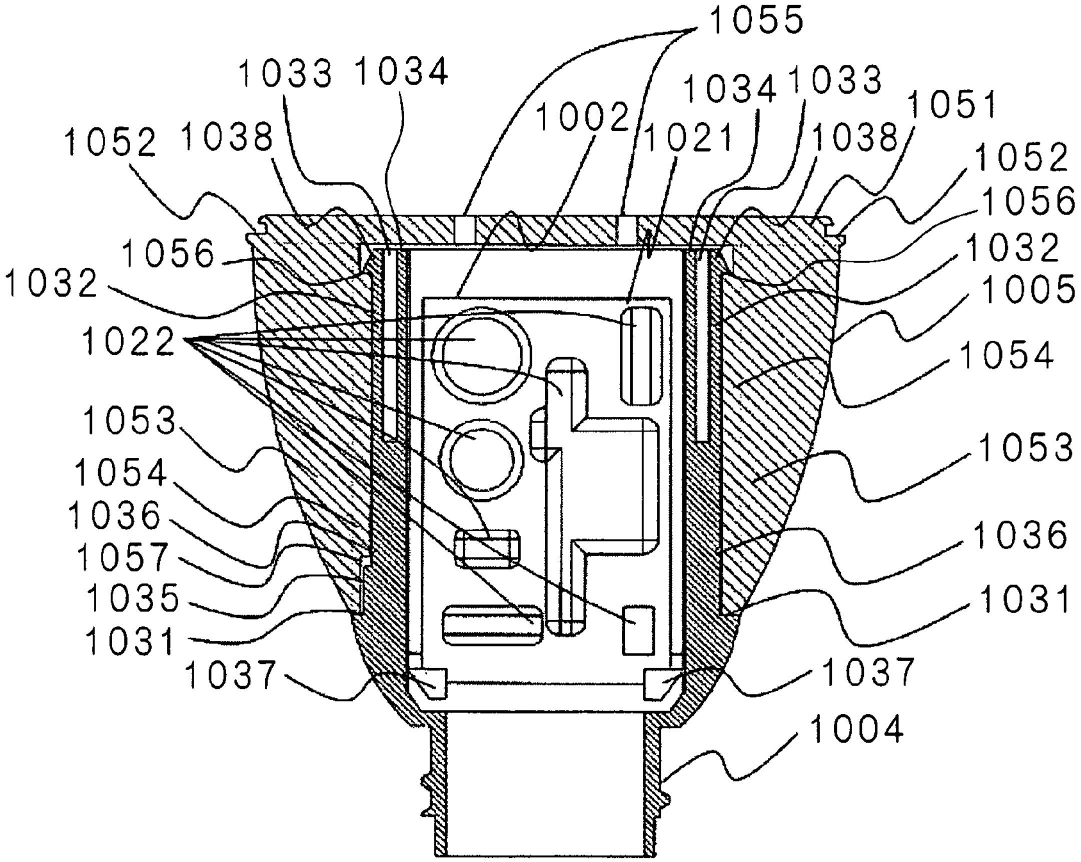
FIG. 8 is a sectional view taken along a line VIII-VIII in FIG. 6 in a situation that an electrically active part is accommodated in an attachment body in FIG. 6.
Figure 9:
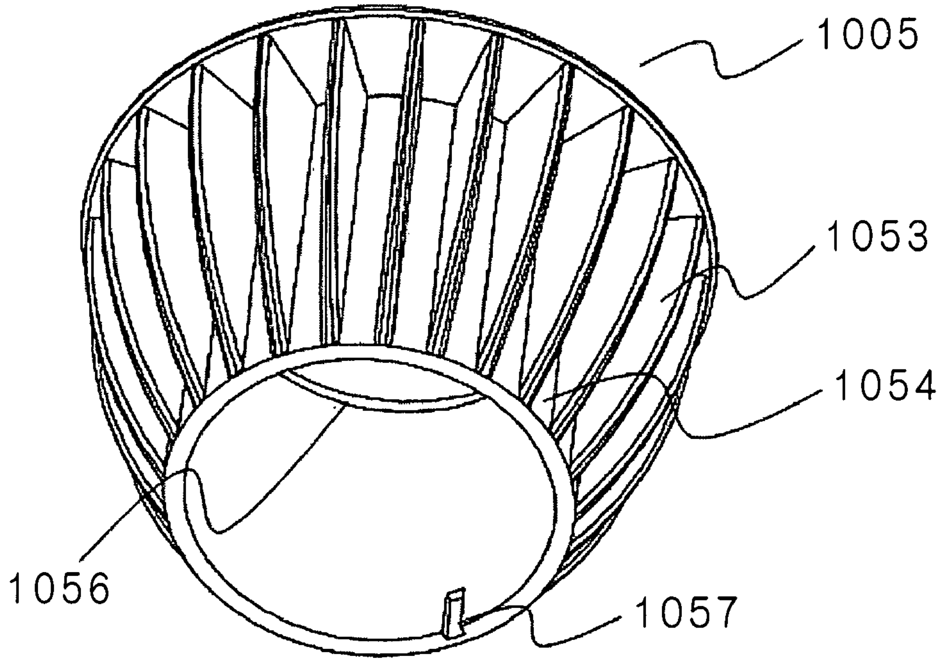
FIG. 9 is a perspective view of a to-be-attached body attached to the attachment body in FIG. 6.
Figure 10:
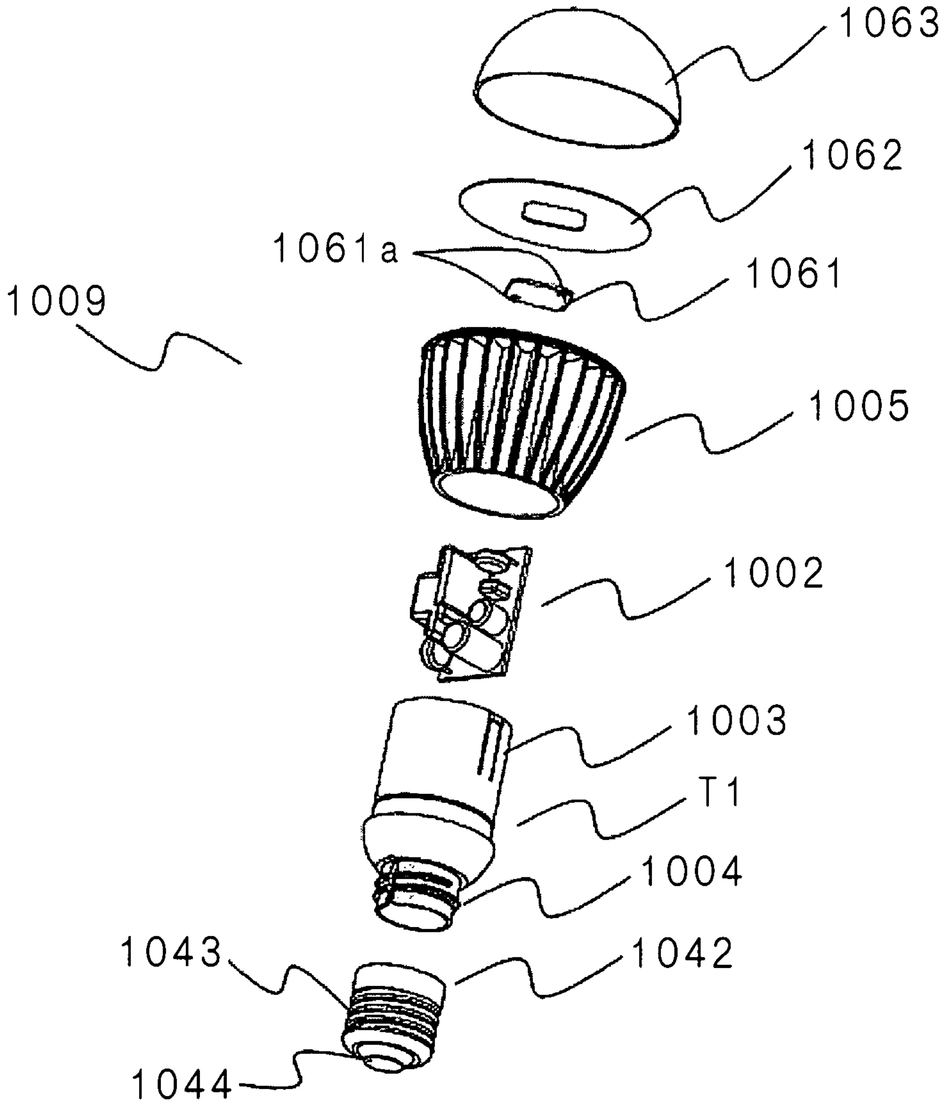
FIG. 10 is an exploded perspective view of a lighting device provided with the attachment body in FIG. 6.

FIG. 6 is a perspective view of an attachment body serving as an insulating part of the lighting device according to Embodiment 3 of the present invention. FIG. 7 is a top view of the attachment body in FIG. 6. FIG. 8 is a sectional view taken along a line VIII-VIII in FIG. 6 in a situation that an electrically active part serving as a drive circuit section (drive section) is accommodated into the attachment body in FIG. 6. FIG. 9 is a perspective view of a to-be-attached body serving as a heat radiating part attached to the attachment body in FIG. 6. FIG. 10 is an exploded perspective view of a lighting device provided with the attachment body in FIG. 6. Further, the up and down directions used in the following description are defined as follows. In a top view, the direction that the electrically active part is accommodated into the attachment body is defined as the down direction. The horizontal direction is defined as a direction perpendicular to the up and down directions.

In the figures, T1 indicates a cylindrical attachment body serving as the insulating part made of an electrical insulation material (e.g., PBT (poly butylene terephthalate)) and having a ring-shaped cross section. The attachment body T1 is constructed from: an accommodating part 1003 serving as a heat radiating part holding cylinder accommodating an electrically active part 1002 serving as a drive circuit section (drive section) such as power supply components; and a base holding part 1004 holding a base 1042 for being connected to a socket for electric bulb.

The accommodating part 1003 has a cylindrical shape. On the outer wall of the accommodating part 1003, a flat holding surface 1031 abutting against the to-be-attached body 1005 serving as the heat radiating part such as a heat sink is provided in the periphery. In the inside of the accommodating part 1003, a cavity accommodating the electrically active part 1002 is formed. At the bottom end of the accommodating part 1003, a base holding part 1004 is provided continuously.

Further, the accommodating part 1003 has: an attaching part 1032 attaching the accommodating part 1003 to the to-be-attached body 1005; a prevention part 1034 for preventing a non-insulation state (communication) between the electrically active part 1002 and the to-be-attached body 1005 caused by a notch 1033; a claw 1035 for preventing the attachment body T1 from rotating relative to the to-be-attached body 1005; a groove 1036 for collecting adhesives (not illustrated) in order to avoid outflow of the adhesives for bonding the accommodating part 1003 to the to-be-attached body 1005; and holding parts 1037 for holding the electrically active part 1002.

At least one of the attaching part 1032 is formed by the notch 1033 formed in a part of the accommodating part 1003 in the up and down directions having a length sufficient for giving elasticity to the attaching part 1032. The tip of the attaching part 1032 is provided with a hook 1038 formed as a unit and protruding in a hook shape inclined downward.

The prevention part 1034 is formed integrally with the accommodating part 1003 such as to prevent a non-insulation state (communication) between the electrically active part 1002 and the to-be-attached body 1005 caused by the notch 1033. The gap $\alpha$ between the prevention part 1034 and the attaching part 1032 is formed such as to be greater than the protrusion length of the hook 1038 provided in the attaching part 1032.

The claw 1035 is provided in a rectangular parallelepiped shape elongated in the up and down directions continuously to the holding surface 1031 on the outer wall of the accommodating part 1003, and is formed in a number of at least one in the accommodating part 1003.

Then, the groove 1036 is formed in a depth sufficient for collecting adhesives in order to avoid outflow of the adhesives for bonding the accommodating part 1003 to the to-be-attached body 1005, in the circumferential direction along the outer wall of the accommodating part 1003.

As illustrated in FIG. 7, the holding parts 1037 protrude on the inner wall of the accommodating part 1003 such as to sandwich and hold the lower part of the electrically active part 1002.

As illustrated in FIG. 8, the electrically active part 1002 is constructed such that a plurality of power supply components 1022, 1022, 1022, . . . are mounted on a rectangular circuit board 1021. The electrically active part 1002 has a width and a length allowed to be accommodated in the accommodating part 1003.

Then, when the electrically active part 1002 is inserted into the attachment body T1 and then the circuit board 1021 is sandwiched by the holding parts 1037, the electrically active part 1002 is stably held in the accommodating part 1003 of the attachment body T1.

Further, as illustrated in FIG. 8, the heat radiating part serving as the to-be-attached body 1005 has: a disk-shaped heat radiation plate 1051 where a light source module 1061 is screwed in the center part on the upper surface; a flange 1052 formed in the periphery of the edge of the heat radiation plate 1051 and abutting against the edge of a light-transmitting part 1063; and a cylindrical holding cylinder 1054 (fixed cylinder) holding heat radiation fins 1053. In the inside of the holding cylinder 1054, a cavity serving as an accommodating part is formed for accommodating the attachment body T1. The heat radiation plate 1051, the flange 1052, the heat radiation fins 1053, and the holding cylinder 1054 are made of, for example, a metallic material such as aluminum, and formed as a unit.

Through holes 1055 and 1055 are provided in the center part of the heat radiation plate 1051. Lead wires (not illustrated) connecting the light source module 1061 with the electrically active part 1002 penetrate the through holes 1055 and 1055.

Further, on the outer peripheral surface of the holding cylinder 1054, a plurality of the heat radiation fins 1053, 1053, 1053, . . . elongated in the up and down directions of the holding cylinder 1054 are provided in parallel to each other in the circumferential direction of the holding cylinder 1054. The dimension measured from the outer peripheral surface of the holding cylinder 1054 to the edge of the heat radiation fin 1053 decreases from the one end on the heat radiation plate 1051 side toward the other end.

Further, in the upper part of the holding cylinder 1054, a step part 1056 locking the hook 1038 provided in the attaching part 1032 is provided in the inside in the circumferential direction. Here, the height and the width of the hook 1038 have values sufficient for locking the attaching part 1032.

Further, in the lower part of the holding cylinder 1054, at least one claw receiving section 1057 accommodating the claw 1035 provided in the attaching part 1032 is provided in the inside. The height of the claw receiving section 1057 is greater than that of the claw 1035, and the width of the claw receiving section 1057 is greater than that of the claw 1035.

Then, when the attachment body T1 holding the electrically active part 1002 inside the accommodating part 1003 is inserted into the to-be-attached body 1005, the attaching part 1032 is pressed by the inner wall of the holding cylinder 1054. The attaching part 1032 has elasticity by virtue of the notch 1033. Thus, as a result of the pressing, the attaching part 1032 is bent in the direction of the electrically active part 1002. Then, the attaching part 1032 having been bent is temporarily accommodated into the gap α. Then, when the attachment body T1 is inserted to a position that the attaching part 1032 reaches the step part 1056, the bend of the attaching part 1032 is released so that the hook 1038 locks to the step part 1056. As such, the attachment body T1 is attached to and held by the to-be-attached body 1005, and further insulation is ensured between the electrically active part 1002 and the to-be-attached body 1005.

Further, in addition to the holding, the claw 1035 fits into the claw receiving section 1057. This prevents the attachment body T1 from rotating relative to the to-be-attached body 1005.

Further, the use of the adhesives in addition to the holding allows the attachment body T1 to be firmly held by the to-be-attached body 1005. Further, the groove 1036 avoids outflow of the adhesives caused when the attachment body T1 is inserted into the to-be-attached body 1005.

As illustrated in FIG. 10, a lighting device 1009 is constructed from: the attachment body T1; the electrically active part 1002; the to-be-attached body 1005; a light source module 1061 provided with a light source such as LEDs; a dome-shaped light-transmitting part 1063 covering the light source module 1061; a reflection part 1062 provided with a hole into which the light source module 1061 is fitted; and a cylindrical base 1042 electrically connected to the electrically active part 1002 and connected to an external power supply.

The light source module 1061 is constructed such that LEDs (not illustrated) are mounted on a rectangular ceramic board. The light source of the light source module 1061 is not limited to LEDs, and may be LDs, organic electroluminescence devices, inorganic EL devices, or a color lamp. Then, in accordance with the employed light source, the circuit board 1021 and the power supply components 1022 constituting the electrically active part 1002 are selected appropriately.

The reflection part 1062 is made of, for example, a reflective material such as PET (polyethylene terephthalate), and provided with a hole into which the light source module 1061 is fitted. The reflection part 1062 is held in a state abutting against the upper surface of the heat radiation plate 1051.

The light-transmitting part 1063 is made of, for example, a translucent material such as PC (polycarbonate), and has in a dome shape. Then, the light-transmitting part 1063 is held on the heat radiation plate 1051 in a state that the edge of the light-transmitting part 1063 abuts against the flange 1052 of the heat radiation plate 1051.

The light source module 1061 is provided with screw holes 1061*a* for being screwed onto the heat radiation plate 1051. The light source module 1061 is screwed onto the heat radiation plate 1051 of the to-be-attached body 1005, with a heat conduction sheet (not illustrated) therebetween. Further, the reflection part 1062 is fitted in the light source module 1061 so as to be held on the heat radiation plate 1051. Then, the light-transmitting part 1063 is caused to abut against the flange 1052 so as to be held on the heat radiation plate 1051. As a result, the light source module 1061 is protected from the outside by the light-transmitting part 1063, and further transmits light. Further, by virtue of the reflection part 1062 and the light-transmitting part 1063, light emitted from the light source module 1061 is efficiently emitted to the outside.

The base holding part 1004 is provided continuously to the lower end of the accommodating part 1003, and has a length shorter than the base 1042 in the up and down directions and an outer diameter smaller than the inner diameter of the accommodating part 1003. In the base holding part 1004, a slit 1041 through which lead wires (not illustrated) penetrate for electrical connection to a power supply part (not illustrated) is provided in the up and down directions in a thickness greater than that of the lead wires. Further, the outer wall of the base holding part 1004 is provided with a screw groove for being screwed and fixed to the base 1042.

The base 1042 has a cavity in the inside. One-end side of the cavity is open. Further, the inner wall of the base 1042 is provided with a screw groove for being screwed and fixed to the base holding part 1004. The outer wall of the base 1042 is formed in the same shape as, for example, an E26 screw base for being attached into a socket. In a case that the direction of screw-in of the screw is opposite to the direction of attachment to the socket, the base 1042 is hardly separated from the base holding part 1004 when the lighting device 1009 is to be removed from the socket. The outer wall of the base 1042 serves as a one-pole terminal 1043. Then, on the closed one-end side of the base 1042, an other-pole terminal 1044 protrudes in a manner insulated from the one-pole terminal 1043 of the outer peripheral surface. The one-pole terminal 1043 and the other-pole terminal 1044 are electrically connected to the electrically active part 1002 through the lead wires.

Then, the attachment body T1 accommodating the electrically active part 1002 is held by the to-be-attached body 1005, and then the base 1042 is screwed into the base holding part 1004. As a result, the attachment body T1 and the to-be-attached body 1005 form a cavity serving as the tightly closed accommodating part accommodating the electrically active part 1002 according to Embodiments 1 and 2. This avoids a situation that dust, particulates, or the like enter the cavity from the outside, and then go into contact with the electrically active part 1002 so as to cause ignition or a fault.

Further, the light source module 1061 is screwed onto the heat radiation plate 1051 of the to-be-attached body 1005, with a heat conduction sheet therebetween. Then, the reflection part 1062 is held on the heat radiation plate 1051, while the light-transmitting part 1063 is held on the heat radiation plate 1051.

The one-pole terminal 1043 and the other-pole terminal 1044 of the base 1042 are electrically connected to the electrically active part 1002 through the lead wires. Then, the electrically active part 1002 is electrically connected to the light source module 1061 through the lead wires via the through hole 1055.

In the lighting device having this configuration, during the course of energization of the light source module 1061, the heat from the light source module 1061 and the heat from the electrically active part 1002 are radiated through the to-be-attached body 1005. Further, the attachment body T1 is attached to the to-be-attached body 1005 by the attaching part 1032, and hence is hardly separated. The electrically active part 1002 is shielded from the to-be-attached body 1005 by the accommodating part 1003, so that insulation is ensured.

Further, at one end on the heat radiation plate 1051 side of the heat radiation fins 1053, the light source module 1061 is provided in a state that the heat radiation plate 1051 is located therebetween. The attachment body T1 is provided at the other end. Further, the base 1042 is held by the base holding part 1004 of the attachment body T1. Thus, when the lighting device is used in a ceiling or the like, the light source module 1061 at high temperatures is located under the base 1042 at low temperatures. Thus, the flow of outside air is guided in a direction from the light source module 1061 to the base 1042.

Here, in the attachment body according to Embodiment 3, as illustrated in FIG. 6, two of the attaching parts 1032 are formed at positions separated by the diameter length of the accommodating part 1003. However, the number of the attaching parts 1032 provided in the accommodating part 1003 is not limited to two. Namely, it is sufficient that the accommodating part 1003 is provided with at least one attaching part 1032. Alternatively, three or more attaching parts 1032 may be provided. As in the present embodiment, when the two attaching parts 1032 are provided at positions separated by the diameter length of the accommodating part 1003, the attachment body T1 is held more firmly by the to-be-attached body 1005 in comparison with a case that one of the attaching part 1032 is employed. This avoids shakiness in the up and down directions and the horizontal directions. Further, when three or more of the attaching parts 1032 are provided, the attachment body T1 is held more stably by the to-be-attached body 1005.

Figure 11A:
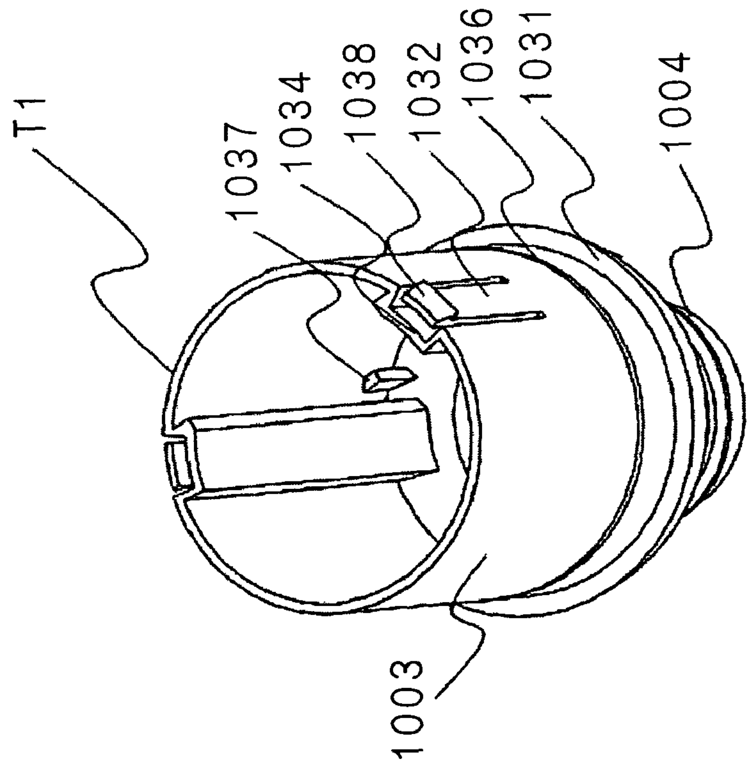
FIGS. 11A and 11B are explanation diagrams illustrating a main part in a situation that the electrically active part is inserted into the attachment body in FIG. 6.
Figure 11B:
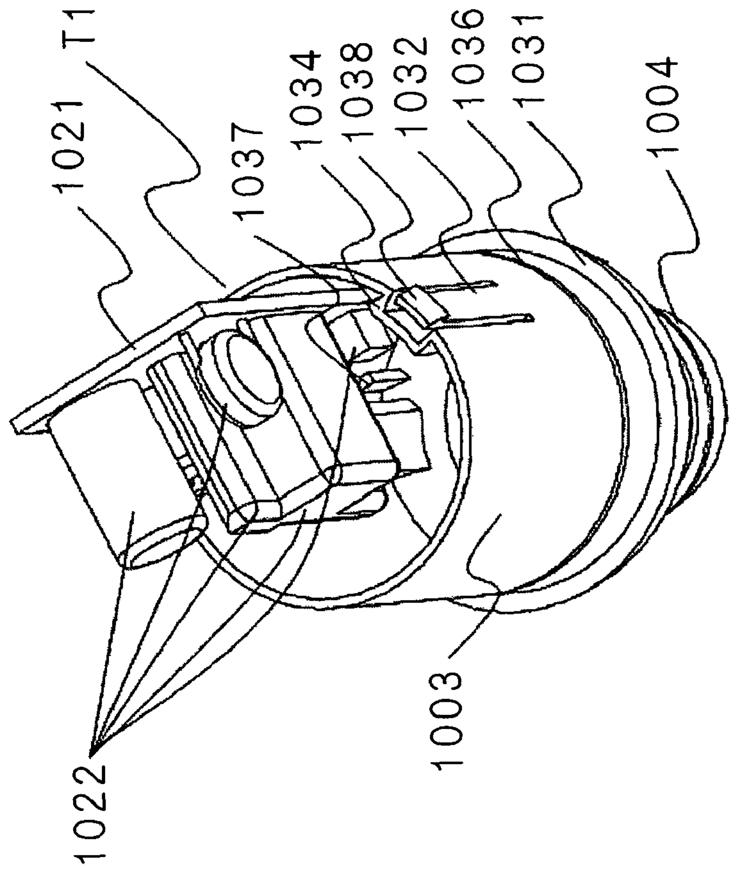

FIGS. 11A and 11B are explanation diagrams illustrating a main part in a situation that the electrically active part 1002 is inserted into the attachment body T1. FIG. 11A illustrates the attachment body T1 in a state before the electrically active part 1002 is inserted. FIG. 11B illustrates a state that the electrically active part 1002 has been inserted into the attachment body T1.

As illustrated in FIG. 7, four of the holding parts 1037 are provided in the inner wall bottom of the accommodating part 1003. As illustrated in FIGS. 11A and 11B, the electrically active part 1002 is held using the inner wall of the prevention part 1034. This approach reduces the number of the holding parts 1037. Specifically, two of the prevention parts 1034 and two of the attaching part 1032 are provided in the accommodating part 1003, with a separation interval smaller than the diameter of the accommodating part 1003. Then, the edge of the circuit board 1021 constituting the electrically active part 1002 is sandwiched by the inner walls of the prevention parts 1034. Further, two of the holding parts 1037 are provided in the inner wall bottom of the accommodating part 1003 so that another edge of the circuit board 1021 is sandwiched by the holding parts 1037 and the inner walls of the prevention parts 1034. As a result, the electrically active part 1002 is held in the accommodating part 1003. From the perspective of holding the electrically active part 1002 by the prevention parts 1034, the holding parts 1037 are not indispensable. However, the holding parts 1037 ensure firmer holding. Since the function of holding the electrically active part 1002 is shared also by the prevention parts 1034, the necessity of additional components in the holding parts 1037 is avoided, and hence the manufacturing cost is reduced.

The claw 1035 is provided in the accommodating part 1003, while the claw receiving section 1057 is provided in the to-be-attached body 1005. However, these positions may be exchanged. That is, the claw 1035 may be provided in the to-be-attached body 1005, while the claw receiving section 1057 may be provided in the accommodating part 1003. Even this configuration avoids the rotation between the attachment body T1 and the to-be-attached body 1005.

Further, the groove 1036 is provided in the accommodating part 1003. However, the groove 1036 may be provided in the to-be-attached body 1005. Even this configuration avoids outflow of the adhesives.

Embodiment 4

Embodiment 4 of the present invention is described below with reference to FIG. 12.

Figure 12:
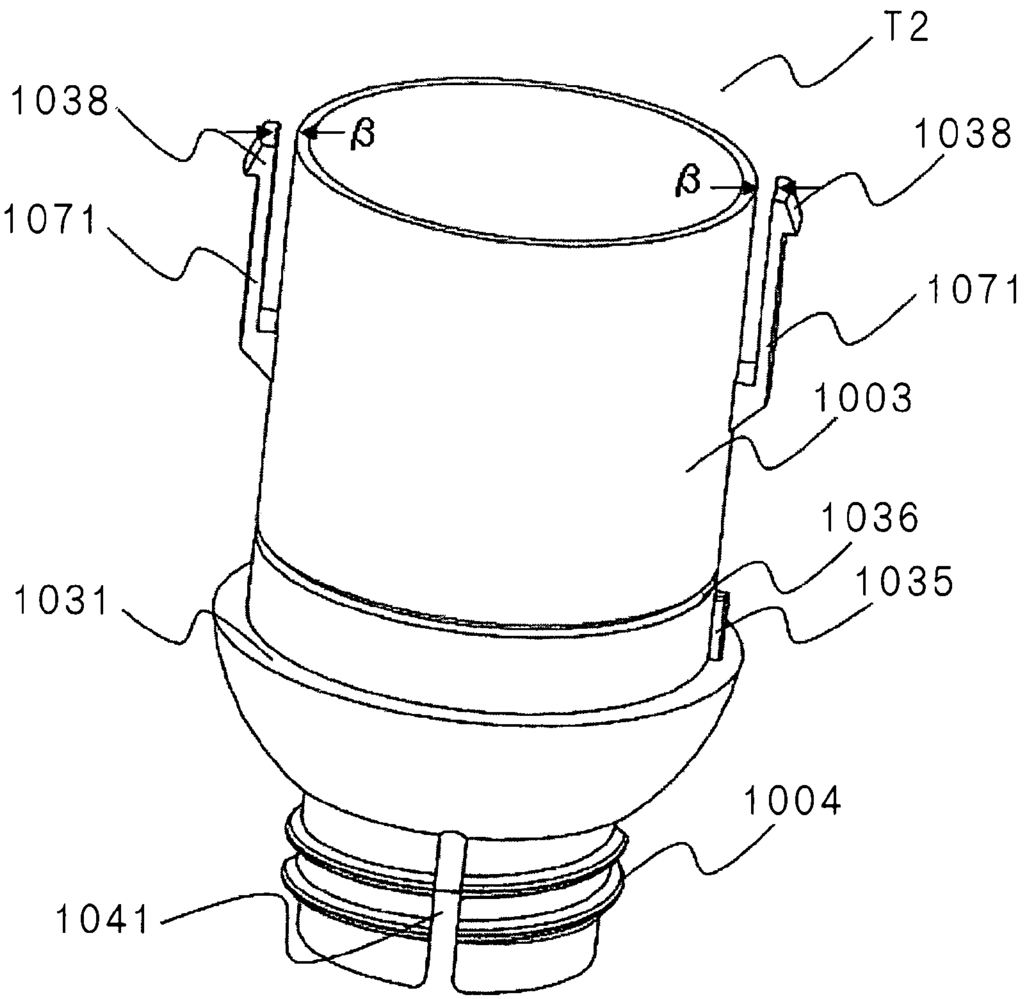
FIG. 12 is a perspective view of an attachment body of a lighting device according to Embodiment 4 of the present invention.

FIG. 12 is a perspective view of an attachment body of a lighting device according to Embodiment 4 of the present invention. Here, like parts to those of Embodiment 3 are designated by like numerals, and their detailed description is omitted.

In this figure, T2 indicates a cylindrical attachment body serving as an insulating part, made of an electrical insulation material and having a ring-shaped cross section. The attachment body T2 is constructed from: the accommodating part 1003 accommodating the electrically active part 1002 such as the power supply components; and the base holding part 1004 holding the base 1042 for being connected to the socket for electric bulb.

The accommodating part 1003 has: an attaching part 1071 attached to the to-be-attached body 1005; a claw 1035 for preventing rotation; and a groove 1036 for collecting adhesives.

At least one of the attaching part 1071 is formed in a manner protruding in a part of the accommodating part 1003 along such a length that elasticity is given in the up and down directions. The tip of the attaching part 1071 is provided with the hook 1038 formed as a unit and protruding in a hook shape inclined downward. The gap β between the accommodating part 1003 and the attaching part 1071 is formed such as to be greater than the protrusion length of the hook 1038 provided in the attaching part 1071.

Then, when the attachment body T2 holding the electrically active part 1002 inside the accommodating part 1003 is inserted into the to-be-attached body 1005, the attaching part 1071 is pressed by the inner wall of the holding cylinder 1054. The attaching part 1071 has elasticity. Thus, as a result of the pressing, the attaching part 1071 is bent in the direction of the electrically active part 1002. Then, the hook 1038 of the attaching part 1071 having been bent is accommodated into the gap β. Then, the bend of the attaching part 1071 is released so that the hook 1038 locks to the step part 1056. As a result, the attachment body T2 is attached to and held by the to-be-attached body 1005, and further insulation is ensured between the electrically active part 1002 and the to-be-attached body 1005.

Here, in the attachment body according to Embodiment 4, as illustrated in FIG. 12, two of the attaching parts 1071 are formed at positions separated by the diameter length of the accommodating part 1003. However, the number of the attaching parts 1071 provided in the accommodating part 1003 is not limited to two. Namely, it is sufficient that the accommodating part 1003 is provided with at least one of the attaching part 1071. Alternatively, three or more of the attaching parts 1071 may be provided. As in the present embodiment, when the two attaching parts 1071 are provided at positions separated by the diameter length of the accommodating part 1003, the attachment body T2 is held more firmly by the to-be-attached body 1005 in comparison with a case that the one attaching part 1071 is employed. This avoids shakiness in the up and down directions and the horizontal directions. Further, when the three or more attaching parts 1071 are provided, the attachment body T2 is held more stably by the to-be-attached body 1005.

The inner diameter of the holding cylinder 1054 of the to-be-attached body 1005 for attaching the attachment body T2 is greater than the outer diameter of the accommodating part 1003. When the inner diameter of the holding cylinder 1054 is smaller than the distance between the attaching parts 1071 in a case that the two attaching parts 1071 are formed at positions separated by the diameter length of the accommodating part 1003, a groove (not illustrated) corresponding to the width and the height of the attaching part 1071 is formed in the to-be-attached body 1005.

Embodiment 5

Embodiment 5 of the present invention is described below with reference to FIGS. 13 and 14.

Figure 13:
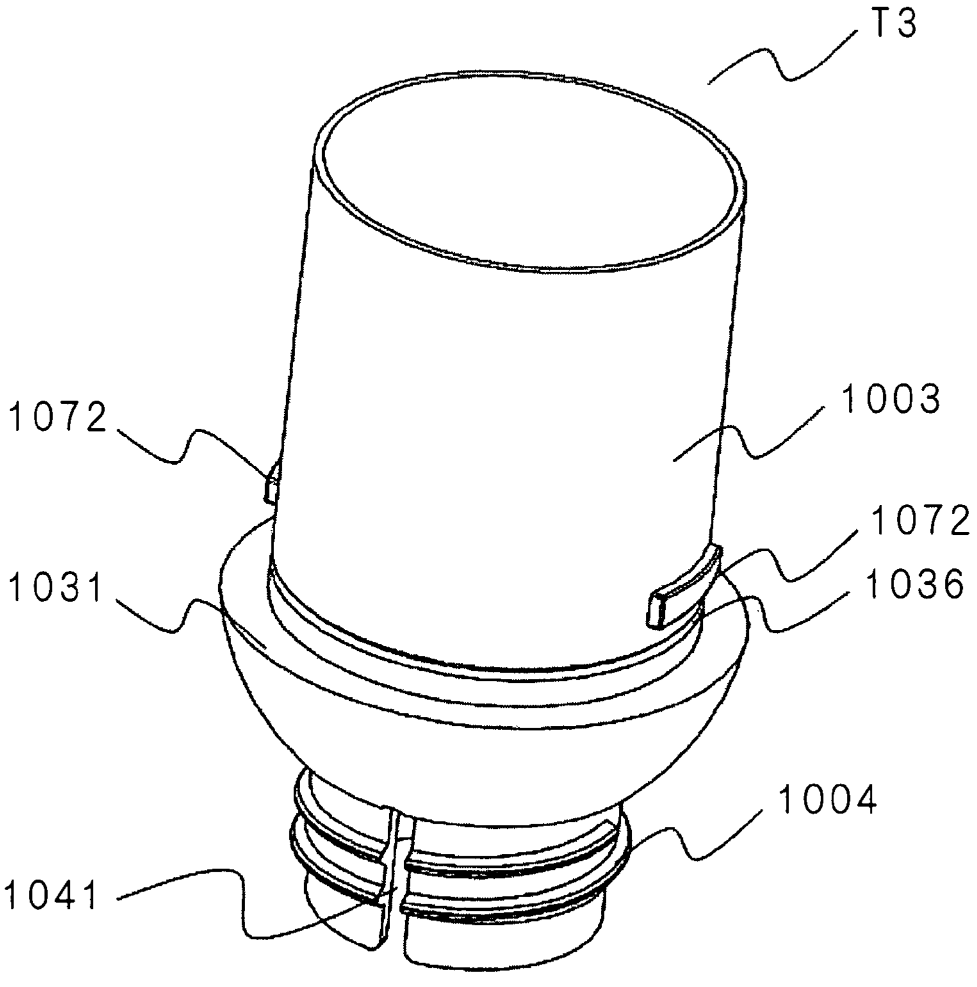
FIG. 13 is a perspective view of an attachment body of a lighting device according to Embodiment 5 of the present invention.
Figure 14:
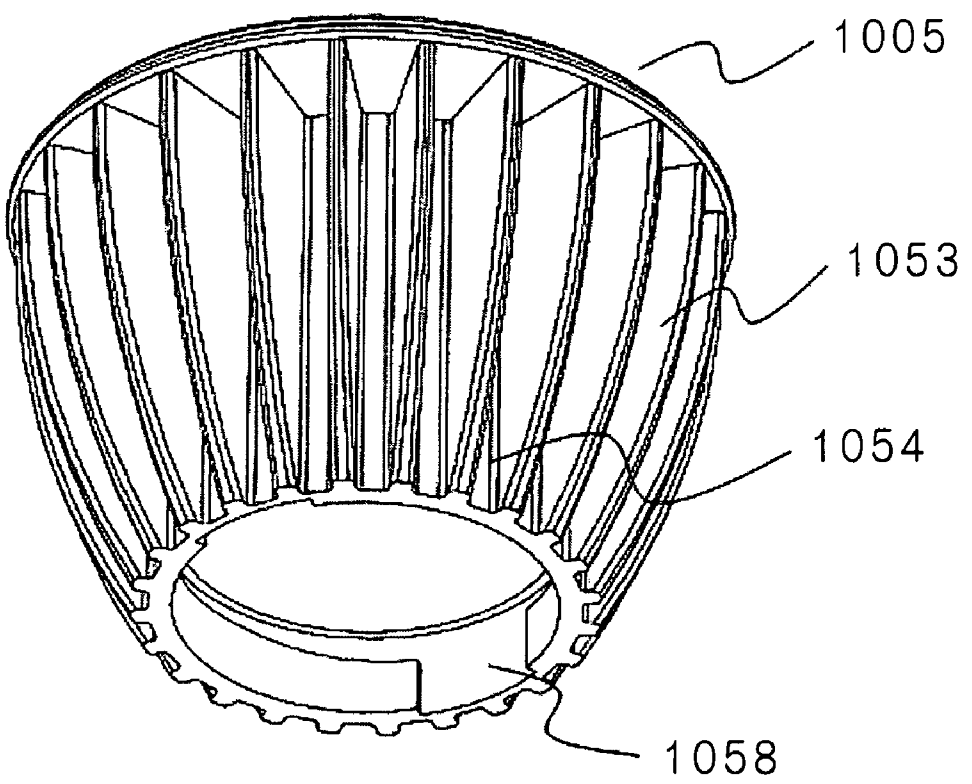
FIG. 14 is a perspective view of a to-be-attached body attached to the attachment body in FIG. 13.

FIG. 13 is a perspective view of an attachment body of a lighting device according to Embodiment 5 of the present invention. FIG. 14 is a perspective view of a to-be-attached body attached to the attachment body of FIG. 13. Here, like parts to those of Embodiment 3 are designated by like numerals, and their detailed description is omitted.

In this figure, T3 indicates a cylindrical attachment body serving as an insulating part, made of an electrical insulation material and having a ring-shaped cross section. The attachment body T3 is constructed from: the accommodating part 1003 accommodating the electrically active part 1002 such as the power supply components; and the base holding part 1004 holding the base 1042 for being connected to the socket for electric bulb (external power supply).

The accommodating part 1003 has an attaching part 1072 and a groove 1036 for collecting adhesives.

As illustrated in FIG. 13, the attaching part 1072 is a protrusion formed on the outer wall of the accommodating part 1003 in a trapezoidal shape elongated in the direction of rotation of the attachment body T3 relative to the to-be-attached body 1005. Further, in the to-be-attached body 1005, as illustrated in FIG. 14, an L-shaped recess 1058 is provided into which the attaching part 1072 is fitted and locked. One end of the L-shaped recess 1058 reaches the opening edge of the holding cylinder 1054 and has a sufficient depth permitting the fit-in of the attaching part 1072. Further, the L shape of the recess 1058 is formed such as to extend from the one end in the up and down directions of the holding cylinder 1054, and then bend along the circumferential direction. The part along the circumferential direction of the holding cylinder 1054 of the recess 1058 becomes thin toward the L shape of the other end.

Then, the attaching part 1072 of the attachment body T3 holding the electrically active part 1002 in the accommodating part 1003 is fitted into the recess 1058 formed on the edge of the to-be-attached body 1005. Then, the attachment body T3 is rotated along the L shape of the recess 1058. When the attaching part 1072 is fitted and locked into the other end of the L-shaped recess 1058, the attachment body T3 is attached to and held by the to-be-attached body 1005, and further insulation is ensured between the electrically active part 1002 and the to-be-attached body 1005.

Here, at the other end of the L shape of the recess 1058, a hole (not illustrated) may further be provided that has a sufficient size for attaching the attaching part 1072. The attaching part 1072 of the attachment body T3 is fitted into the recess 1058. Then the attachment body T3 is rotated along the L shape of the recess 1058, and then further rotated from the other end of the L shape of the recess 1058. As a result, the attaching part 1072 is pressed and bent by the recess 1058. Then, the attachment body T3 is rotated to a position that the attaching part 1072 reaches the hole. The bend of the attaching part 1072 is released so that the attaching part 1072 locks to the hole. As such, the attachment body T3 is attached to and held by the to-be-attached body 1005, and further insulation is ensured between the electrically active part 1002 and the to-be-attached body 1005.

Further, at least one of the attaching part 1072 is formed in the accommodating part 1003. When two or more of the attaching parts 1072 are employed, firmer holding is achieved.

Here, the definition of the up and down directions employed in Embodiments 3 to 5 is merely for convenience. That is, in the actual use of the lighting device employing the attachment body, actual orientation may be different from this definition.

Further, the lighting device according to Embodiments 3 to 5 has been described for the case of a lighting device having the shape of an electric bulb illustrated in the figures. However, the present invention may be applied to other lighting devices as long as a mode is adopted that an attachment body accommodating an electrically active part such as a power supply circuit is locked in a state that insulation from a to-be-attached body is ensured. The present invention is not limited to Embodiments 3 to 5. That is, various kinds of modifications and applications may be employed without departing from the range of spirit of the present invention.

For the purpose of users' convenience and effective use of resources, it is preferable that the lighting device is constructed such as to allow maintenance work such as component change and cleaning to be performed separately for each component like the light source module, the heat radiating part, the drive circuit section, and the light-transmitting part. An implementation example of a lighting device is described below in which components such as the heat radiating part, the drive circuit section, or the light-transmitting part are attached in a removable manner.

Embodiment 6

Figure 15:
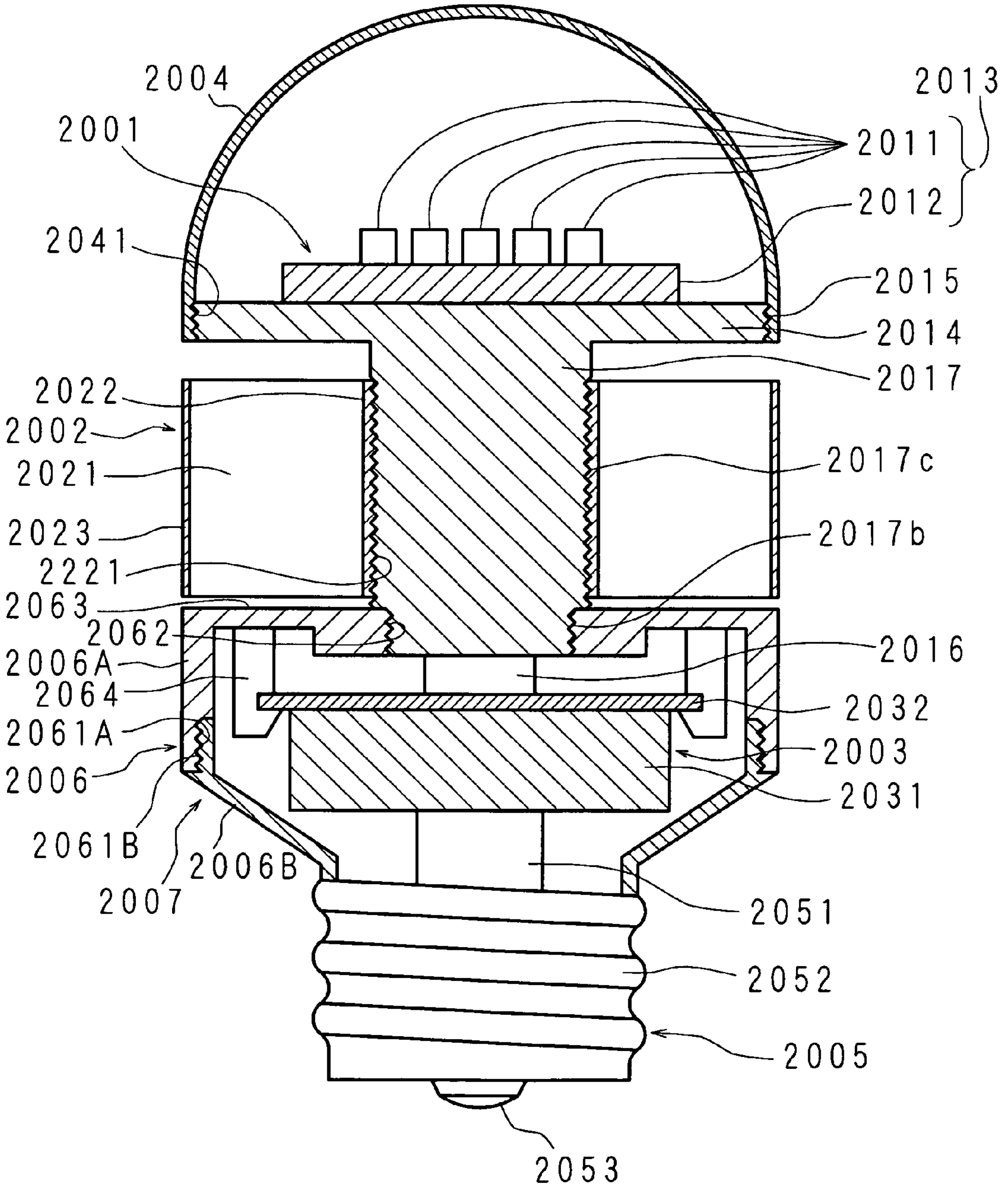
FIG. 15 is a schematic longitudinal sectional view of a main part, illustrating a configuration of a lighting device according to Embodiment 6 of the present invention.
Figure 16:
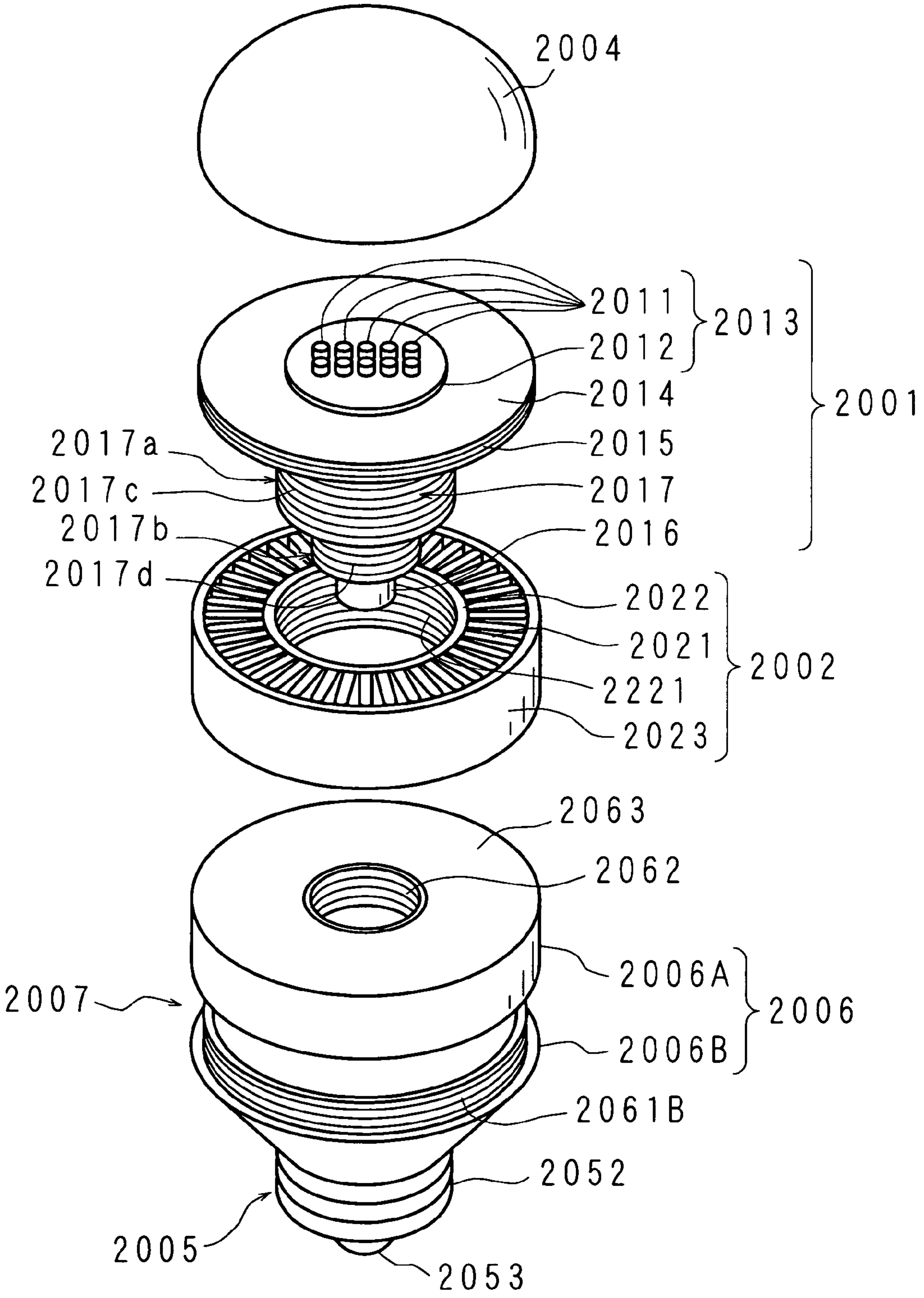
FIG. 16 is an exploded perspective view of a main part of the lighting device according to Embodiment 6 of the present invention.
Figure 17:
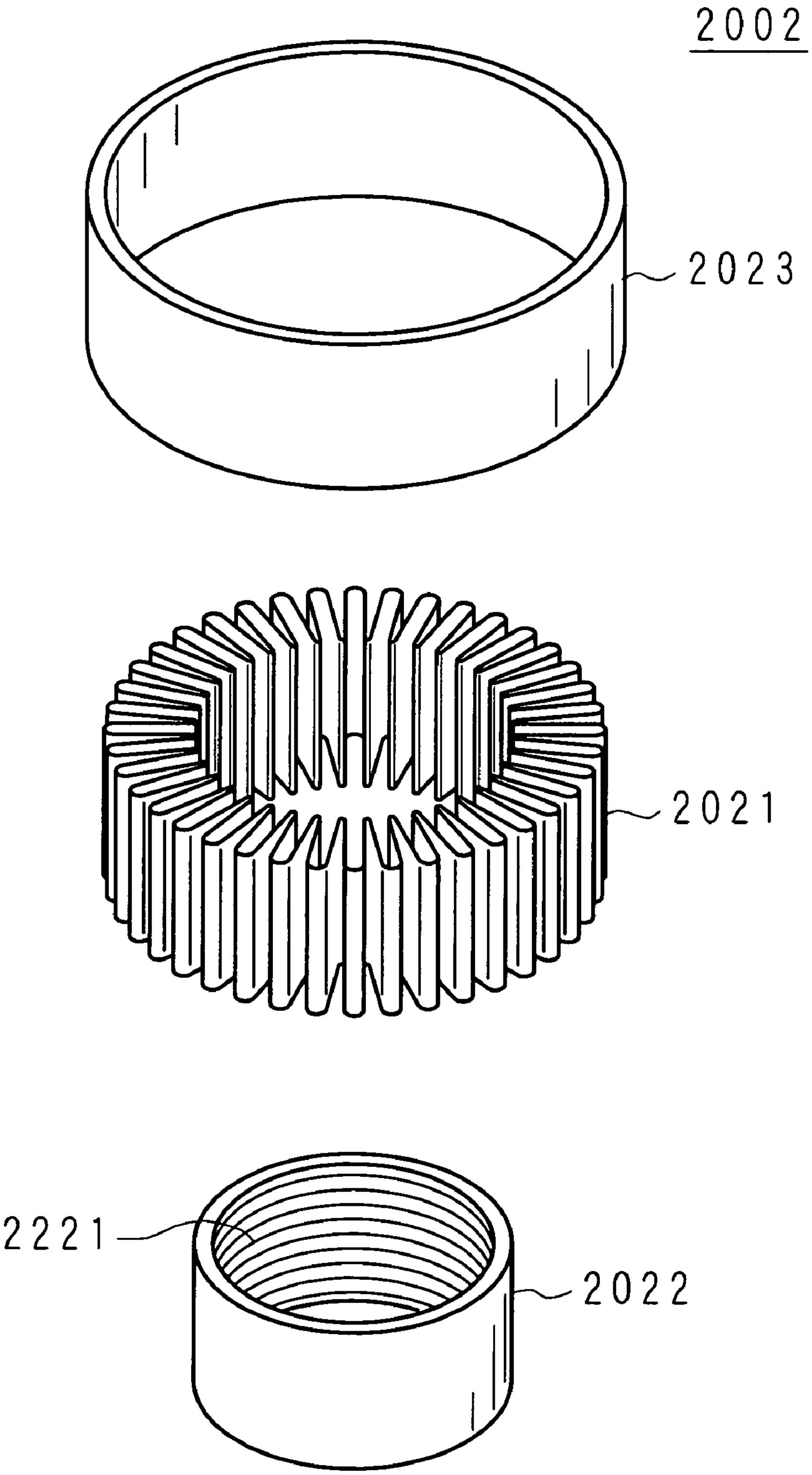
FIG. 17 is an exploded perspective view of a main part, illustrating a configuration of a heat radiating part of the lighting device according to Embodiment 6 of the present invention.

Embodiment 6 of the present invention is described below with reference to drawings. FIG. 15 is a schematic longitudinal sectional view illustrating a configuration of a lighting device according to Embodiment 6 of the present invention. FIG. 16 is an exploded perspective view of a main part. FIG. 17 is an exploded perspective view of a main part, illustrating a configuration of a heat radiating part 2002 according to Embodiment 6 of the present invention.

The lighting device according to Embodiment 6 has the shape of an electric bulb and has: a light source part 2001 provided with a light source, for example, composed of a plurality of white LEDs 2011, 2011, 2011, . . . ; a cover part 2004 serving as a dome-shaped light-transmitting part covering the light source part 2001; a heat radiating part 2002 for radiating the heat generated by the light source part 2001; a circuit part 2007 composed of a drive circuit section 2003 (drive section) for driving the light source and a circuit accommodating part 2006 accommodating the drive circuit section 2003; and a base part 2005 electrically connected to the drive circuit section 2003.

The light source part 2001 has an LED module 2013 serving as a light source module constructed from the plurality of white LEDs 2011, 2011, 2011, . . . and a disk-shaped LED board 2012 having one surface where the plurality of white LEDs 2011, 2011, 2011, . . . are soldered. The LED board 2012 is mounted on a disk-shaped base plate 2014 having a larger diameter than the LED board 2012 by screwing or the like, with an electrical insulation material (not illustrated) therebetween. As a result, the other surface of the LED board 2012 goes into thermally close contact with one surface on the cover part 2004 side of the base plate 2014. On the other surface of the base plate 2014, a cylindrical holding column 2017 protrudes for holding the LED module 2013. The end part 2017*b* on the base part 2005 side of the holding column 2017 is screwed into and held by the circuit accommodating part 2006 in a removable manner. On the edge of the base plate 2014, a male screw part 2015 for screwing the cover part 2004 in a removable manner is provided. Further, in the surface on the base part 2005 side of the holding column 2017, a cylindrical first pin plug 2016 connected to the LED board 2012 protrudes so as to permit electric attaching and detaching between the drive circuit section 2003 and the light source part 2001. In the outer peripheral surface of the middle part 2017*a* of the holding column 2017, a male screw 2017*c* is provided. Then, the male screw 2017*c* constitutes a second screwing mechanism with the inner holding cylinder 2022 of a later-described heat radiating part 2002, so that the heat radiating part 2002 is screwed around the holding column 2017 in a removable manner. On the other hand, the end part 2017*b* on the base part 2005 side of the holding column 2017 has a reduced diameter in comparison with the middle part 2017*a*. A male screw 2017*d* is provided in the outer peripheral surface of the end part 2017*b* on the base part 2005 side. The male screw 2017*d* constitutes a third screwing mechanism with the screw hole 2062 of a later-described circuit accommodating part 2006, so that the holding column 2017 is screwed into the circuit accommodating part 2006 in a removable manner. Further, in association with attaching and detaching between the circuit accommodating part 2006 and the holding column 2017, attaching and detaching between the circuit part 2007 and the holding column 2017 are performed. The base plate 2014 and the holding column 2017 are made of aluminum, and formed as a unit. Further, the LED module 2013, the base plate 2014, and the holding column 2017 are provided concentrically.

In the inside of the edge of the cover part 2004 covering and protecting the LED module 2013 and the base plate 2014, a female screw part 2041 to be screwed around the male screw part 2015 of the base plate 2014 is provided. The cover part 2004 is screwed around the base plate 2014 in a removable manner by a first screwing mechanism constructed from the male screw part 2015 of the base plate 2014 and the female screw part 2041 of the cover part 2004. The cover part 2004 is made of opaque white acrylic resin.

The heat radiating part 2002 has: a cylindrical inner holding cylinder 2022 having a female screw 2221 provided inside for being screwed around the holding column 2017; a corrugated heat radiation fin 2021 provided in the outer peripheral surface of the inner holding cylinder 2022; and an outer holding cylinder 2023 holding the heat radiation fin 2021 from the outer side. The corrugated heat radiation fin 2021 has an annular shape, and is in a radial arrangement around the axial center of the inner holding cylinder 2022. Thus, the flow of outside air is guided in a direction from the light source part 2001 at high temperatures to the base part 2005 at low temperatures, that is, in an axial direction of the inner holding cylinder 2022. The inner holding cylinder 2022, the heat radiation fin 2021, and the outer holding cylinder 2023 are all made of aluminum, and provided concentrically. The heat generated by the LED module 2013 is conducted through the base plate 2014, the holding column 2017, the inner holding cylinder 2022, and the heat radiation fin 2021, in this order, and then released through the heat radiation fin 2021 to outside air via the surface of the heat radiation fin 2021. By virtue of the second screwing mechanism constructed from the female screw 2221 provided inside the inner holding cylinder 2022 of the heat radiating part 2002 and the male screw 2017*c* provided in the outer peripheral surface of the middle part 2017*a* of the holding column 2017, the heat radiating part 2002 is fixed to the holding column 2017 in a removable manner.

The circuit accommodating part 2006 provided continuously to the one-end side of the base part 2005 has an approximately cylindrical shape whose diameter decreases from the end part on the base part 2005 side toward the tip side. The circuit accommodating part 2006 accommodates the drive circuit section 2003 having: a drive circuit 2031 composed of various kinds of circuit components for driving the LED module 2013; and a circuit board 2032 having one surface where the drive circuit 2031 is soldered. The circuit accommodating part 2006 has a disk part 2063 in the end part on the light source part 2001 side. In the center part of the disk part 2063, a screw hole (a female screw) 2062 into which the male screw 2017*d* of the end part 2017*b* on the base part 2005 side of the holding column 2017 is to be screwed is provided. By virtue of the third screwing mechanism constructed from the male screw 2017*d* of the end part 2017*b* on the base part 2005 side and the screw hole 2062, the circuit accommodating part 2006 is attached to the holding column 2017 in a removable manner. Further, the circuit accommodating part 2006 is divided into two portions consisting of: a cylindrical part 2006A on the light source part 2001 side and a diameter decrease part 2006B on the base part 2005 side. A female screw 2061A is provided inside the edge of the cylindrical part 2006A. On the outer side of the diameter decrease part 2006B, a male screw 2061B to be screwed around the female screw 2061A is provided. The female screw 2061A and the male screw 2061B constitute a fourth screwing mechanism. The cylindrical part 2006A and the diameter decrease part 2006B are screwed with each other in a removable manner by virtue of the fourth screwing mechanism.

On the other hand, in one surface (the surface on the base part 2005 side) of the disk part 2063 of the circuit accommodating part 2006, a hanging member 2064 having elasticity protrudes. Then, the edge of the circuit board 2032 of the drive circuit section 2003 is hung in a removable manner by the hanging member 2064. The other surface of the circuit board 2032 is facing the surface on the base part 2005 side of the holding column 2017 where the first pin plug 2016 is provided. In the other surface of the circuit board 2032, a first receptacle (not illustrated) having a shape corresponding to and mechanically and electrically connected to the first pin plug 2016 is provided. Further, in one surface of the circuit board 2032, in addition to the drive circuit 2031, a second receptacle (not illustrated) is provided, so that the second receptacle is mechanically and electrically connected to or disconnected from a later-described second pin plug 2051 of the base part 2005.

In the approximately cylindrical base part 2005, the outer peripheral surface is provided with a screw groove for being screwed into an electric bulb socket. Further, the other-end side has a bottom. The outer peripheral surface of the base part 2005 serves as a one-pole terminal 2052. Further, the bottom has an other-pole terminal 2053 provided in a protruding manner such as to be insulated from the one-pole terminal 2052 of the outer peripheral surface. The other-pole terminal 2053 and the one-pole terminal 2052 are connected to the second pin plug 2051 provided along the center of the base part 2005. The second pin plug 2051 is connected to or disconnected from the drive circuit section 2003 via a second receptacle (not illustrated).

Figure 18:
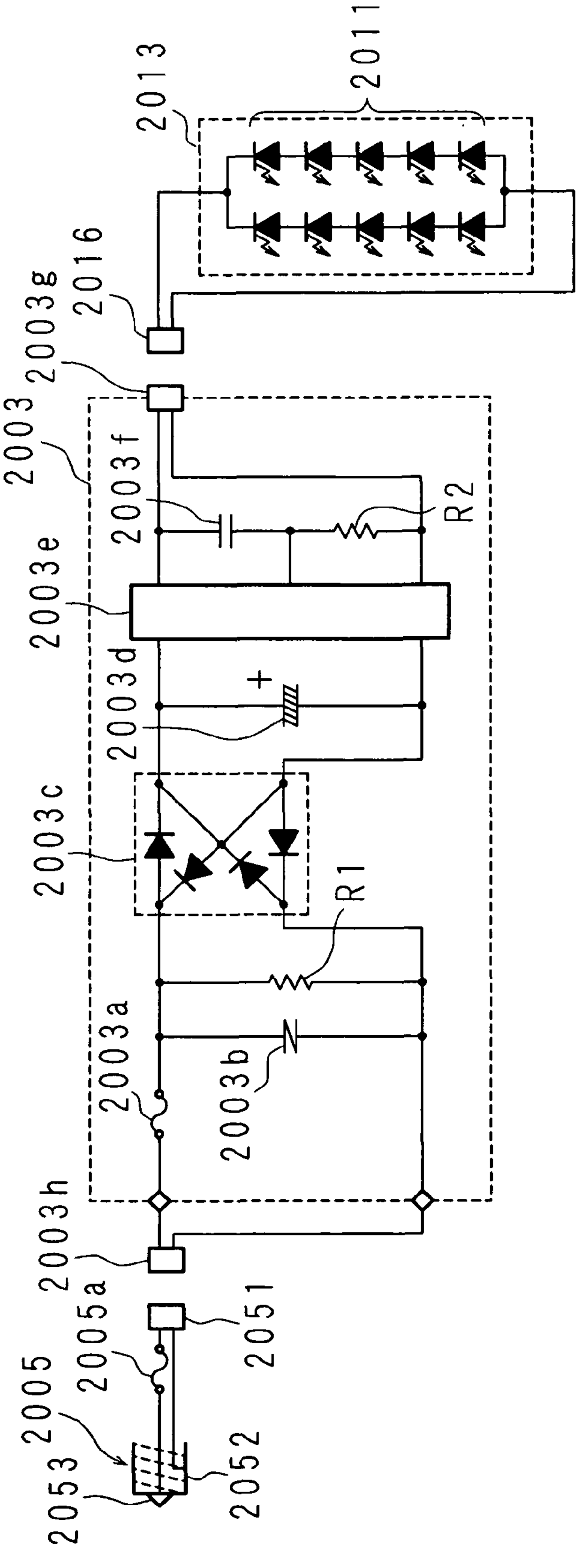
FIG. 18 is an electrical diagram of a main part of the lighting device according to Embodiment 6 of the present invention.

FIG. 18 is an electrical diagram of a main part of the lighting device according to Embodiment 6 of the present invention. The drive circuit section 2003 has one end electrically connected to the LED module 2013, and the other end electrically connected through a current fuse 2005*a* to the base part 2005. The drive circuit section 2003 and the LED module 2013 are electrically connected to each other through the first pin plug 2016 and a later-described first receptacle 2003*g*. Further, the drive circuit section 2003 and the base part 2005 are electrically connected to each other through the second pin plug 2051 and a later-described second receptacle 2003*h*. The current fuse 2005*a* provided between the drive circuit section 2003 and the base part 2005 blows out rapidly in case of over-current so as to shut off the circuit and avoid smoke generation or ignition.

The drive circuit section 2003 has: a thermal fuse (or a protector that repeats make and break, or the like) 2003*a* that blows out and shuts off the power supply when heat generation causes a temperature higher than a given value; a varistor 2003*b* who absorbing an overvoltage; a diode bridge 2003*c* for performing full-wave rectification on a commercial AC voltage; a smoothing capacitor (an electrolytic capacitor) 2003*d* for converting the current (a pulsating current) from the diode bridge 2003*c* into a smoother DC; a DC-DC converter circuit 2003*e* directly connectable to a commercial AC power supply composed of a power supply module (such as an HIC (Hybrid Integrated Circuit)) for reducing the smoothed high DC voltage into a low DC voltage (e.g., DC 12 V) for driving the LED; a capacitor (a ceramic capacitor) 2003*f* for detecting the voltage of the LED module 2013; a voltage detecting circuit composed of a series circuit of a resistor R2; a first receptacle 2003*g* mechanically and electrically connected to the first pin plug 2016 of the LED module 2013; a second receptacle 2003*h* mechanically and electrically connected to the second pin plug 2051 of the base part 2005; a resistor R1 for voltage stabilization; and an output current setting resistor R2.

As described above, the cover part 2004, the light source part 2001, the heat radiating part 2002, and the circuit part 2007 are attached respectively in a removable manner by virtue of the first screwing mechanism, the second screwing mechanism, and the third screwing mechanism. Thus, a necessary part alone may be removed depending on the necessity, and then maintenance, component change, or the like may be performed. For example, when the cover part 2004 is broken, the cover part 2004 may be revolved clockwise so that the screwing of the first screwing mechanism may be released. Then, the cover part 2004 may be separated from the base plate 2014, and then replaced by a new cover part 2004. Further, for example, when wire breakage occurs in the light source part 2001 or alternatively when the heat radiation fin 2021 of the heat radiating part 2002 is covered with dust, as described above, the cover part 2004 may be removed and then the holding column 2017 may be revolved clockwise so that the screwing of the third screwing mechanism may be released. Then, the light source part 2001 and the heat radiating part 2002 may be separated from the circuit part 2007, and then the heat radiating part 2002 may further be revolved clockwise so that the screwing of the second screwing mechanism may be released. Then, the heat radiating part 2002 may be separated from the holding column 2017 of the light source part 2001, and then the light source part 2001 may be replaced or alternatively the heat radiation fin 2021 may be cleaned.

Further, for example, when wire breakage occurs in the drive circuit section 2003 accommodated inside the circuit accommodating part 2006 of the circuit part 2007, the diameter decrease part 2006B of the circuit accommodating part 2006 may be revolved clockwise so that the screwing of the fourth screwing mechanism may be released. Then, the diameter decrease part 2006B and the base part 2005 may be removed, and then the drive circuit section 2003 may be separated from the hanging member 2064. Then, the drive circuit section 2003 alone may be exchanged. As such, without the necessity of removing the entirety of the circuit part 2007 from the holding column 2017, the drive circuit section 2003 alone may be replaced from the base part 2005 side. This situation is simple. Further, the circuit accommodating part 2006 may be used without replacement.

The examples described above have been explained for a case that each screwing mechanism is released when revolved clockwise. However, actual implementation is not limited to this. That is, a configuration may be employed that each screwing mechanism is released when revolved counterclockwise.

Further, the examples described above have been explained for a case that each screwing mechanism is released when the cover part 2004 in the first screwing mechanism, the holding column 2017 in the second screwing mechanism, the heat radiating part 2002 in the third screwing mechanism, or the diameter decrease part 2006B in the fourth screwing mechanism is revolved in the same direction, respectively. However, actual implementation is not limited to this. For example, the direction of revolution for releasing of at least one screwing mechanism may be different from those of other screwing mechanisms. In this case, other screwing mechanisms whose releasing is not intended are prevented from being released unintentionally.

The lighting device according to Embodiment 6 of the present invention is not limited to the technical contents described above. For example, a single lighting device may be used as various kinds of lighting devices each having a mutually different power consumption. That is, in a case that a DC-DC converter is employed and the drive circuit section 2003 has even a capability of 60-W type, a lighting device of 20-W type, 40-W type, or 60-W type is realized respectively when a light source part 2001 of 20-W type, 40-W type, or 60-W type is attached.

Embodiment 6 of the present invention has been described for a case that the drive circuit section 2003 and the base part 2005 are electrically connected to each other through the second pin plug and the second receptacle. However, actual implementation is not limited to this. For example, lead wires may be employed for the connection. In this case, attaching and detaching between the drive circuit section 2003 and the base part 2005 become difficult. However, the relation of the circuit part 2007 to the light source part 2001, the heat radiating part 2002, and the cover part 2004 is not changed. Thus, these are mutually detached and attached easily, and no difficulty arises.

Embodiment 6 of the present invention has been described for a case that the cover part 2004 is opaque white. However, actual implementation is not limited to this. For example, when a colored cover part 2004 is employed, light of various kinds of color is available which is not realized by the white LEDs 2011, 2011, 2011, . . . alone in the light source.

In Embodiment 6 of the present invention the heat radiating part 2002 has been constructed by providing the corrugated heat radiation fin 2021 between the inner holding cylinder 2022 and the outer holding cylinder 2023. However, actual implementation is not limited to this. For example, a plurality of plate-shaped fins may be provided radially between the inner holding cylinder 2022 and the outer holding cylinder 2023. Even in this case, a similar effect is obtained.

Embodiment 6 of the present invention has been described for a case that the heat radiating part 2002 and the cover part 2004 is attached to the light source part 2001 in a removable manner. However, actual implementation is not limited to this. For example, the heat radiating part 2002 and the cover part 2004 may be attached directly in a removable manner. Even in this case, a similar effect is obtained.

Embodiment 6 of the present invention has been described for a case that the heat radiating part 2002 is screwed around the outer peripheral surface of the middle part 2017*a* of the holding column 2017 of the light source part 2001 by the second screwing mechanism and the end part 2017*b* on the base part 2005 side of the holding column 2017 is screwed into the circuit accommodating part 2006 by the third screwing mechanism so that the heat radiating part 2002 and the light source part 2001 are in a removable manner by virtue of the screwing mechanisms. However, actual implementation is not limited to this. That is, it is sufficient that the holding column 2017 (the light source part 2001) and the heat radiating part 2002 are constructed to be removable, respectively. For example, an engagement mechanism may be constructed from: an engagement hole provided in the holding column 2017; and an engagement piece provided in the heat radiating part 2002 and engaging with the engagement hole. Then, by virtue of this, the holding column 2017 and the heat radiating part 2002 may be removable. Alternatively, an engagement hole may be provided in the heat radiating part 2002, while an engagement piece may be provided in the holding column 2017. Further, the description has been given above for a case that the heat radiating part 2002 has the outer holding cylinder 2023. However, the outer holding cylinder 2023 may be omitted. Further, the heat radiation fin 2021 may be constructed to be removable independently. In each case, regardless of the orientation of installation of the lighting device according to Embodiment 6 of the present invention, a satisfactory heat radiation efficiency is maintained.

Embodiment 7

Figure 19:
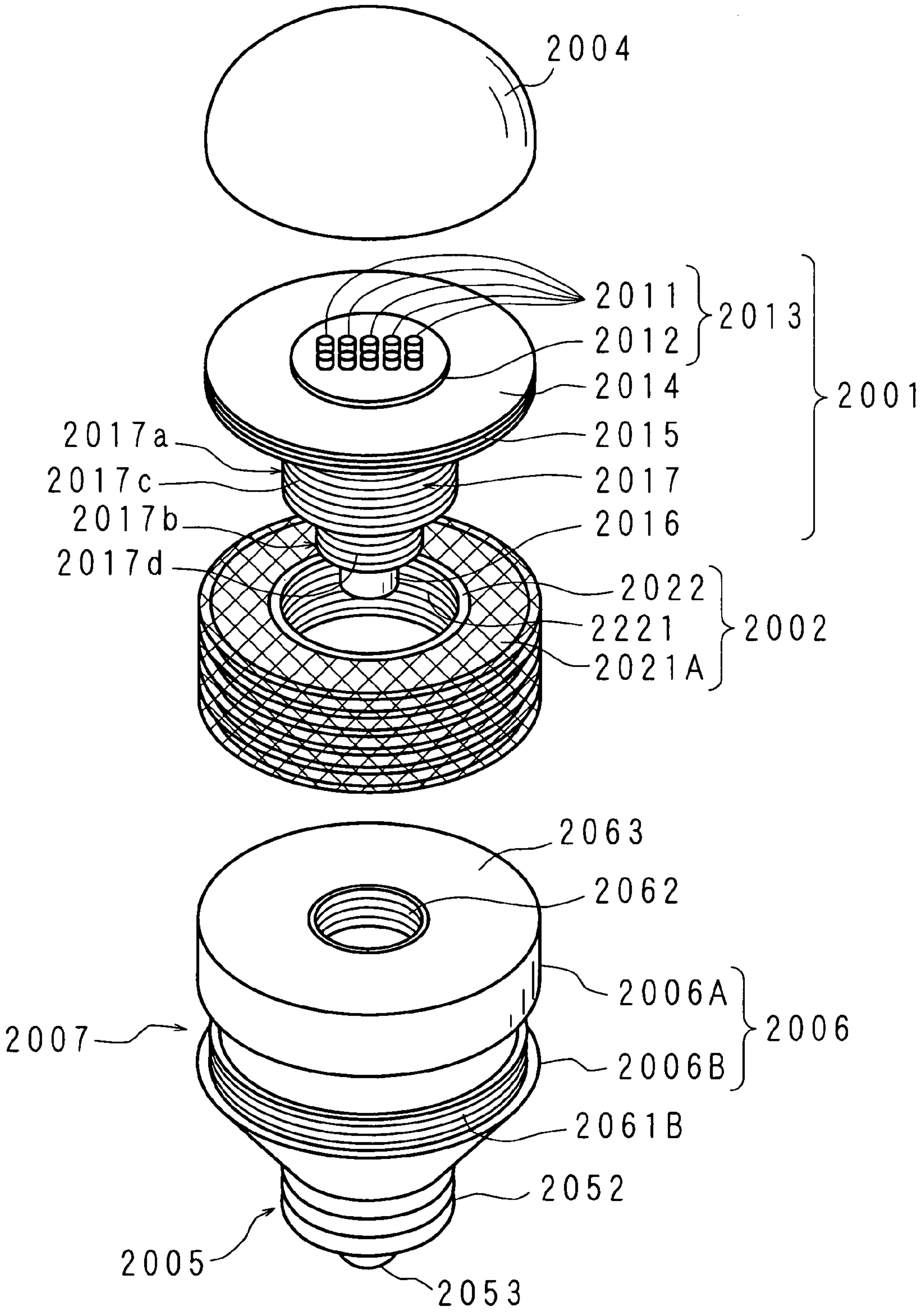
FIG. 19 is an exploded perspective view of a main part, illustrating a configuration of a lighting device according to Embodiment 7 of the present invention.

FIG. 19 is an exploded perspective view of a main part, illustrating a configuration of a lighting device according to Embodiment 7 of the present invention. Here, like parts to those of Embodiment 6 are designated by like numerals, and their detailed description is omitted.

The heat radiating part 2002 of the lighting device according to Embodiment 7 of the present invention has: a cylindrical inner holding cylinder 2022 having a female screw 2221 provided inside for being screwed around the holding column 2017; and a heat radiation disk group 2021A composed of a plurality of mesh heat radiation disks (heat radiation plates) held by the inner holding cylinder 2022. The heat radiation disk has an annular shape having an outer diameter approximately equal to the diameter of the base plate 2014. Further, the center part of the heat radiation disk is provided with a through hole having an inner diameter that is approximately equal to the outer diameter of the inner holding cylinder 2022 and that allows the inner holding cylinder 2022 to penetrate. Then, the heat radiation disk is fixed to the outer peripheral surface of the inner holding cylinder 2022. The plurality of heat radiation disks are provided in parallel to each other (stacked) in the axial direction along the outer peripheral surface of the inner holding cylinder 2022, so as to constitute the heat radiation disk group 2021A. The inner holding cylinder 2022 and the heat radiation disk group 2021A are both made of aluminum.

In Embodiment 7, the heat generated by the LED module 2013 is conducted through the base plate 2014, the holding column 2017, the inner holding cylinder 2022, and the heat radiation disk group 2021A, in this order. After that, the heat generated by the LED module 2013 is released to outside air flowing through the outer side and the mesh space of the heat radiation disk group 2021A. The heat radiation disk of the lighting device according to Embodiment 7 of the present invention is mesh. Thus, a sufficient heat radiation area is ensured. The heat radiating part 2002 is screwed around the holding column 2017 in a removable manner by a second screwing mechanism similar to that of Embodiment 6. When the heat radiating part 2002 is to be removed, as described in Embodiment 6, the light source part 2001 and the heat radiating part 2002 are removed and then the heat radiating part 2002 is revolved clockwise so that the second screwing mechanism is released. Then, the heat radiating part 2002 is separated from the holding column 2017 of the light source part 2001. Here, actual implementation is not limited to this example. That is, the screwing mechanism may be constructed such that the direction of revolution for releasing the screwing mechanism is counterclockwise.

Embodiment 7 has been described for a case that the heat radiation disk group 2021A is made of aluminum. However, actual implementation is not limited to this. For example, a raw material such as copper having a high thermal conductivity may be employed.

Embodiment 8

Figure 20:
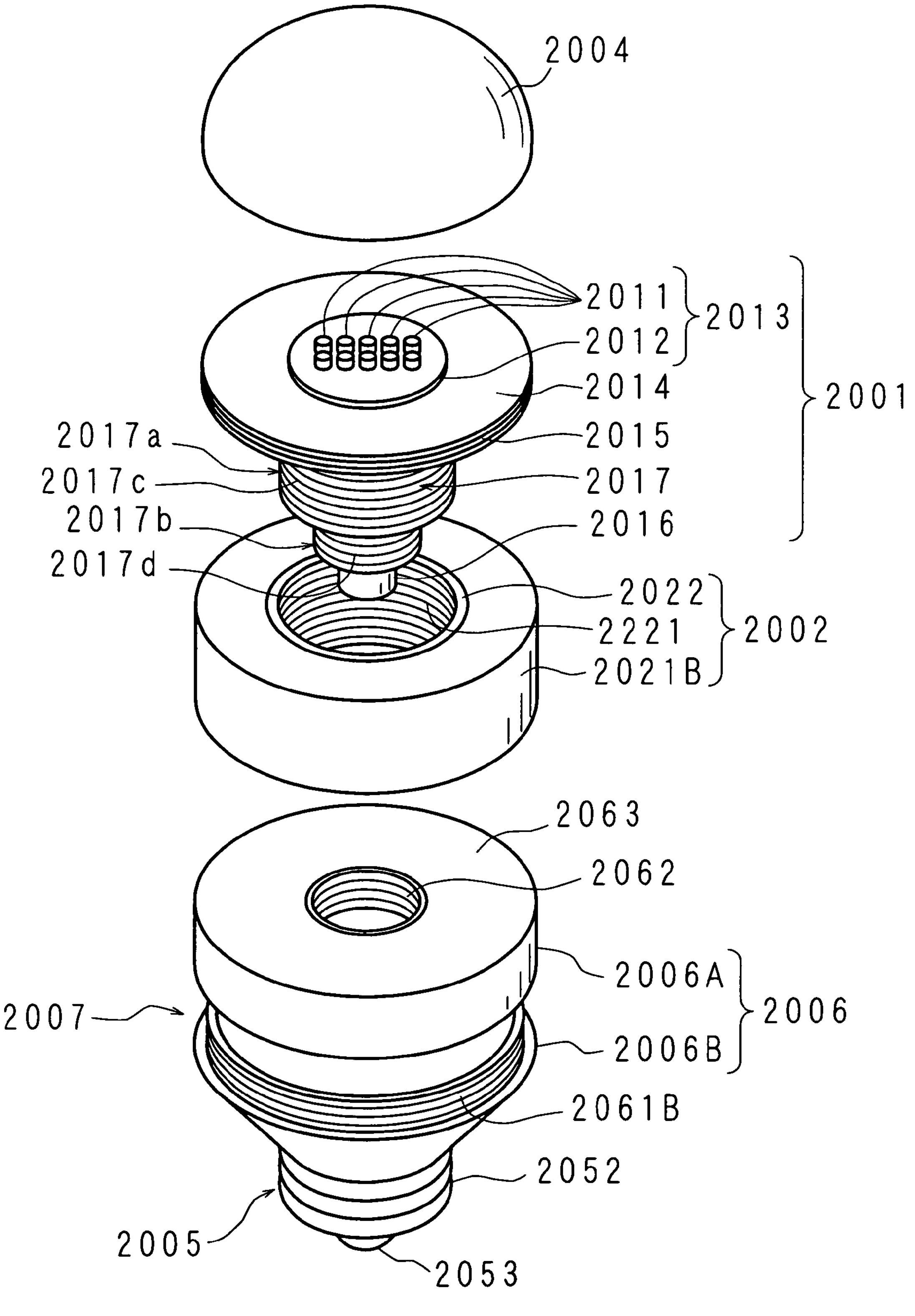
FIG. 20 is an exploded perspective view of a main part, illustrating a configuration of a lighting device according to Embodiment 8 of the present invention.

FIG. 20 is an exploded perspective view of a main part, illustrating a configuration of a lighting device according to Embodiment 8 of the present invention. Here, like parts to those of Embodiment 6 or 7 are designated by like numerals, and their detailed description is omitted.

The heat radiating part 2002 of the lighting device according to Embodiment 8 of the present invention has: a cylindrical inner holding cylinder 2022 having a female screw 2221 provided inside for being screwed around the holding column 2017; and a porous heat radiation block 2021B fixed to the to inner holding cylinder 2022. The heat radiation block 2021B has a cylindrical shape having a diameter approximately equal to that of the base plate 2014. The center part of the heat radiation block 2021B is provided with a through hole having an inner diameter that is approximately equal to the outer diameter of the inner holding cylinder 2022 and that allows the inner holding cylinder 2022 to penetrate. In a state that the inner holding cylinder 2022 is inserted into the through hole, the inner surface of the through hole of the heat radiation block 2021B is fixed to the outer peripheral surface of the inner holding cylinder 2022. The inner holding cylinder 2022 and the heat radiation block 2021B are both made of aluminum.

When a compact (metal powder) composed of metal powder having the form of so-called heteromorphic powder or spherical powder is heat-treated at a temperature near the melting point of the metal, a liquid phase is formed only in the particle surfaces of the metal powder. Thus, so-called necking is formed in the contacting parts between metal particles. In the remaining parts of the contacting parts, so-called inter-metal-particles space is formed. Thus, in the heat-treated metal powder (sintered metal), durability (strength) is improved by the necking, and further a porous material is obtained that contains a large number of open pores and closed pores formed by the inter-metal-particles space. The heat radiation block 2021B made of such porous sintered metal has a sufficient heat radiation area.

In Embodiment 8, the heat generated by the LED module 2013 is conducted through the base plate 2014, the holding column 2017, the inner holding cylinder 2022, and the heat radiation block 2021B, in this order. After that, the heat generated by the LED module 2013 is released to outside air flowing through the outer surface of the heat radiation block 2021B and the inner surfaces of the internal open pores. The heat radiating part 2002 is screwed around the holding column 2017 in a removable manner by a second screwing mechanism similar to that of Embodiment 6. When the heat radiating part 2002 is to be removed, as described in Embodiment 6, the light source part 2001 and the heat radiating part 2002 are removed and then the heat radiating part 2002 is revolved clockwise so that the second screwing mechanism is released. Then, the heat radiating part 2002 is separated from the holding column 2017 of the light source part 2001. Here, actual implementation is not limited to this example. That is, the screwing mechanism may be constructed such that the direction of revolution for releasing the screwing mechanism is counterclockwise.

Embodiment 8 has been described for a case that the inner holding cylinder 2022 and the heat radiation block 2021B are made of aluminum. However, actual implementation is not limited to this. For example, employable materials include: metals such as bronze and stainless steel having a satisfactory heat radiation property; and raw materials such as ceramics that may be sintered.

Embodiment 9

Figure 21:
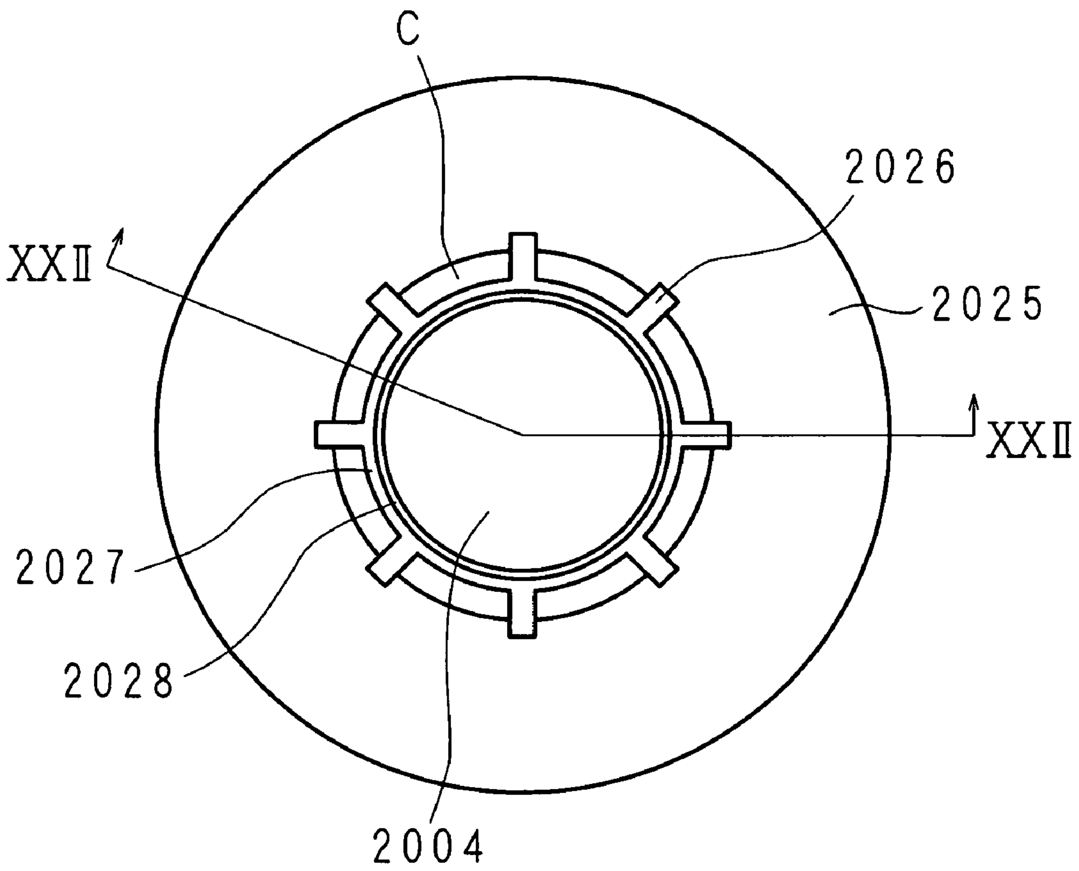
FIG. 21 is a plan view of a main part of a lighting device according to Embodiment 9 of the present invention, viewed from a cover part side.
Figure 22:
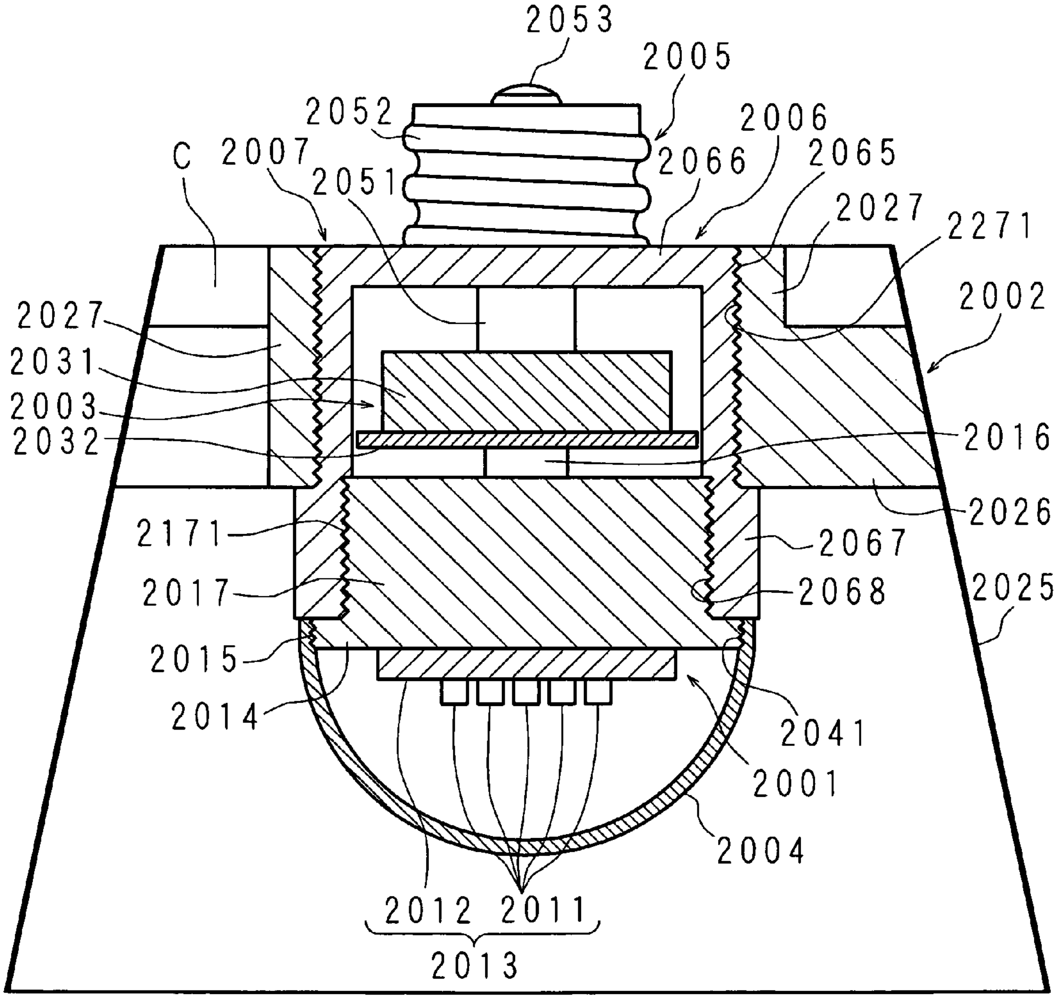
FIG. 22 is a sectional view taken along a line XXII-XXII in FIG. 21.

FIG. 21 is a plan view of a main part of a lighting device according to Embodiment 9 of the present invention, viewed from a cover part 2004 side. FIG. 22 is a sectional view taken along a line XXII-XXII in FIG. 21. Here, like parts to those of Embodiments 6 to 8 are designated by like numerals, and their detailed description is omitted.

The lighting device according to Embodiment 9 of the present invention has a circuit part 2007 composed of: a cylindrical circuit accommodating part 2006 provided, in the inside, with a screw hole (a female screw) 2068 into which the holding column 2017 of the light source part 2001 is screwed; and a drive circuit section 2003. The outer peripheral surface of the holding column 2017 is provided with a male screw 2171 for being screwed into a circuit accommodating part side wall 2067. The screw hole 2068 and the male screw 2171 constitute a fifth screwing mechanism. Then, the light source part 2001 is attached to the circuit accommodating part side wall 2067 in a removable manner by virtue of the fifth screwing mechanism. The edge of one end of the circuit accommodating part side wall 2067 abuts against the base plate 2014. The circuit accommodating part 2006 is made of aluminum, and is connected to the base part 2005 with an insulating member (not illustrated) therebetween.

The circuit accommodating part 2006 accommodates the drive circuit section 2003 having: a drive circuit 2031 composed of various kinds of circuit components for driving the LED module 2013; and a disk-shaped circuit board 2032 having one surface where the drive circuit 2031 is soldered. The circuit board 2032 has a diameter approximately equal to the inner diameter of the circuit accommodating part 2006. The drive circuit section 2003 is inserted into the circuit accommodating part 2006. The other surface of the circuit board 2032 is facing the surface on the base part 2005 side of the holding column 2017 where the first pin plug 2016 is provided. The other surface of the circuit board 2032 is provided with a first receptacle (not illustrated) corresponding to the first pin plug 2016.

The outer peripheral surface of the circuit accommodating part 2006 is provided with a male screw 2065 around which the heat radiating part 2002 is to be screwed in a removable manner. The edge of one end of the circuit accommodating part 2006 abuts against the base plate 2014. The other-end side has a disk-shaped base plate 2066. The center part of the outer surface of the bottom plate 2066 is provided with an approximately cylindrical base part 2005 with an insulating member (not illustrated) therebetween. The center part of the inner surface of the bottom plate 2066 is provided with a second pin plug 2051 connected to the base part 2005. The drive circuit section 2003 has a second receptacle (not illustrated) corresponding to the second pin plug 2051. Then, the base part 2005 is connected to the drive circuit section 2003 via the second pin plug 2051.

The heat radiating part 2002 has: a cylindrical to-be-held cylinder 2027 whose inside is provided with a female screw 2271 for being screwed into the male screw 2065 of the circuit accommodating part 2006; link plates 2026, 2026, 2026, . . . provided in parallel to each other in the circumferential direction of the to-be-held cylinder 2027; and a heat radiation shade 2025 having a truncated conical shape linked to the to-be-held cylinder 2027 via the link plates 2026, 2026, 2026, . . . . The female screw 2271 of the to-be-held cylinder 2027 and the male screw 2065 of the circuit accommodating part 2006 constitute a sixth screwing mechanism. Then, the heat radiating part 2002 is fixed to the circuit accommodating part 2006 in a removable manner by virtue of the sixth screwing mechanism.

On the outer peripheral surface of the to-be-held cylinder 2027, eight of the link plates 2026, 2026, 2026, . . . are arranged at equal intervals with air passages C therebetween. The heat radiation shade 2025 is arranged so as to surround the cover part 2004, the light source part 2001, and the circuit accommodating part 2006, and is linked to the link plates 2026, 2026, 2026, . . . in the inside of one end part. Further, the heat radiation shade 2025 has a diameter increasing with departing from the to-be-held cylinder 2027. The to-be-held cylinder 2027, the link plates 2026, 2026, 2026, . . . , and the heat radiation shade 2025 are all made of aluminum, and formed as a unit.

In Embodiment 9, the heat generated by the LED module 2013 is conducted through the base plate 2014, the holding column 2017, the circuit accommodating part side wall 2067, the to-be-held cylinder 2027, the link plates 2026, 2026, 2026, . . . , and the heat radiation shade 2025, in this order. At that time, the heat generated by the LED module 2013 is released to outside air by outside air flowing through the inside of the heat radiation shade 2025 via the air passages C and outside air flowing through the outer side of the heat radiation shade 2025. Further, the heat radiation shade 2025 has a diameter increasing with departing from the to-be-held cylinder 2027, and also has the function of adjusting the angle of irradiation.

Embodiment 9 has been described for a case that the to-be-held cylinder 2027, the link plates 2026, 2026, 2026, . . . , and the heat radiation shade 2025 are made of aluminum. However, actual implementation is not limited to this. For example, employable materials include: metals such as bronze and stainless steel having a satisfactory heat radiation property; and raw materials such as ceramics and resins having a satisfactory thermal conductivity.

On the other hand, the edge of the base plate 2014 is provided with a male screw part 2015 around which the cover part 2004 is to be screwed in a removable manner, while the inside of the edge of the cover part 2004 is provided with a female screw part 2041 for being screwed into the male screw part 2015. Thus, for example, when the cover part 2004 is broken, the cover part 2004 may be revolved clockwise so that the cover part 2004 may be separated from the base plate 2014. Then, the cover part 2004 may be replaced by a new one. Further, for example, when wire breakage occurs in the light source part 2001, the cover part 2004 may be removed as described above and then the holding column 2017 may be revolved clockwise so that the screwing of the fifth screwing mechanism may be released. Then, the light source part 2001 may be separated from the circuit accommodating part 2006, and then replaced by a new one. On the other hand, for example, when dust on the outer side and the inner side of the heat radiation shade 2025 of the heat radiating part 2002 is to be cleaned, the heat radiating part 2002 may be revolved clockwise so that the screwing of the sixth screwing mechanism may be released. Then, the heat radiating part 2002 may be separated from the circuit accommodating part 2006. Then, the heat radiation shade 2025 may be cleaned. Further, for example, when wire breakage occurs in the drive circuit section 2003, the light source part 2001 may be removed as described above. Then, the drive circuit section 2003 may be extracted so that the drive circuit section 2003 may be removed from the second pin plug 2051. Then, the drive circuit section 2003 may be replaced by a new one.

Here, for the purpose of easiness of extraction of the drive circuit section 2003, a knob may be provided in the other surface of the drive circuit section 2003. Further, the examples described above have been explained for a case that the fifth and the sixth screwing mechanisms are released when revolved clockwise. However, actual implementation is not limited to this. That is, a configuration may be employed that each screwing mechanism is released when revolved counterclockwise.

In Embodiment 9, the fifth screwing mechanism has been constructed from the male screw 2171 provided in the outer peripheral surface of the holding column 2017 of the light source part 2001 and the screw hole (a female screw) 2068 provided inside the circuit accommodating part side wall 2067. However, actual implementation is not limited to this. This screwing mechanism may be constructed such that a female screw is provided at the previous male screw position and a male screw is provided at the previous female screw position.

Embodiment 10

Figure 23:
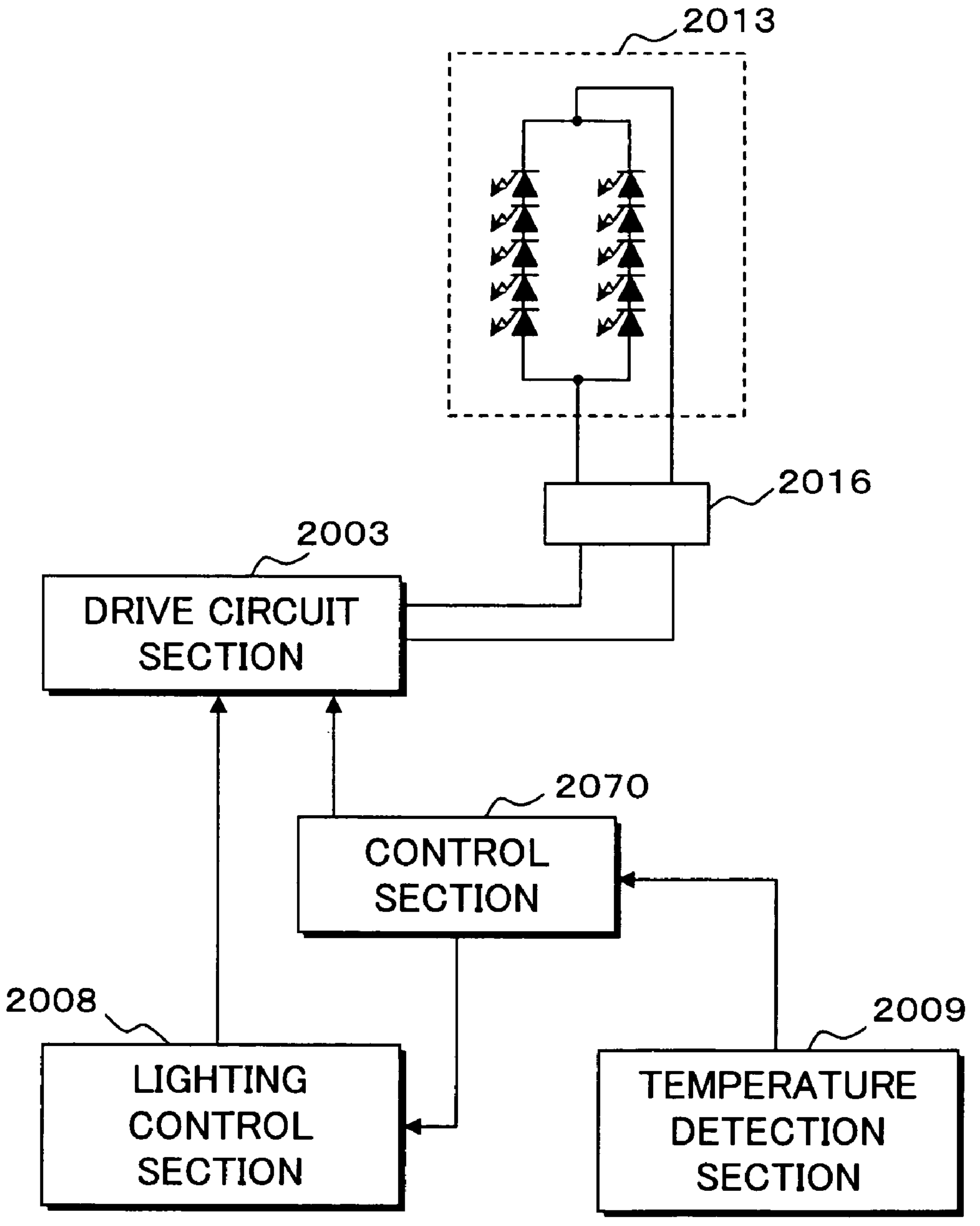
FIG. 23 is a block diagram describing a configuration of a lighting device according to Embodiment 10 of the present invention.

FIG. 23 is a block diagram describing a configuration of a lighting device according to Embodiment 10 of the present invention. Here, like parts to those of Embodiments 6 to 9 are designated by like numerals, and their detailed description is omitted.

The lighting device according to Embodiment 10 has a drive circuit section 2003 connected to the LED module 2013 via the first pin plug 2016. The lighting device further has: a control section 2070 controlling the drive circuit section 2003; a temperature detection section 2009 for detecting the temperature of the LED module 2013; and a lighting control section 2008 turning ON or OFF the white LEDs 2011, 2011, 2011, . . . of the LED module 2013 on the basis of the detection result from the temperature detection section 2009.

When the plurality of white LEDs 2011, 2011, 2011, . . . are used, a large amount of heat is generated by the LED module 2013 and hence the temperature of the LED module 2013 reaches 100° C. or more in some cases. Further, it is assumed that component change is performed by a user with bare hand. Thus, for the purpose of preventing a situation that the user suffers from burns at the time of component change during the usage, the temperature of a part (e.g., the cover part 2004 and the heat radiating part 2002) going into contact with the user's bare hand need to be controlled. Further, if LEDs were kept operating at high temperatures, the lifetime of the LEDs would be reduced. With taking such situations into consideration, it is preferable that turning ON/OFF of the white LEDs 2011, 2011, 2011, . . . is controlled such that the temperature of the LED module 2013 does not exceed 90° C. (a safety limit temperature).

The temperature detection section 2009 is provided on the LED board 2012, and detects the temperature of the LED module 2013. For example, when the detection result from the temperature detection section 2009 is at or higher than the safety limit temperature, the control section 2070 instructs the lighting control section 2008 to turn OFF the white LEDs 2011, 2011, 2011, . . . of the LED module 2013. Thus, the lighting control section 2008 turns OFF the white LEDs 2011, 2011, 2011, . . . . After that, when the temperature of the LED module 2013 goes lower and hence the detection result from the temperature detection section 2009 becomes at or lower than the safety limit temperature, the control section 2070 instructs the lighting control section 2008 to turn ON the white LEDs 2011, 2011, 2011, . . . . Thus, the lighting control section 2008 turns ON the white LEDs 2011, 2011, 2011, . . . .

Embodiment 10 of the present invention has been described for a case that the safety limit temperature is 90° C. However, actual implementation is not limited to this. That is, the safety limit temperature may be set up variably depending on the necessity.

Embodiment 10 of the present invention has been described for a case that the lighting control section 2008 is provided and when the temperature of the LED module 2013 is at or higher the safety limit temperature, the white LEDs 2011, 2011, 2011, . . . are turned OFF. However, actual implementation is not limited to this. For example, current control means for controlling the current supplied to the white LEDs 2011, 2011, 2011, . . . of the LED module 2013 may be provided and when the temperature of the LED module 2013 is at or higher the safety limit temperature, the current supplied to the white LEDs 2011, 2011, 2011, . . . may be reduced.

Embodiment 11

Figure 24:
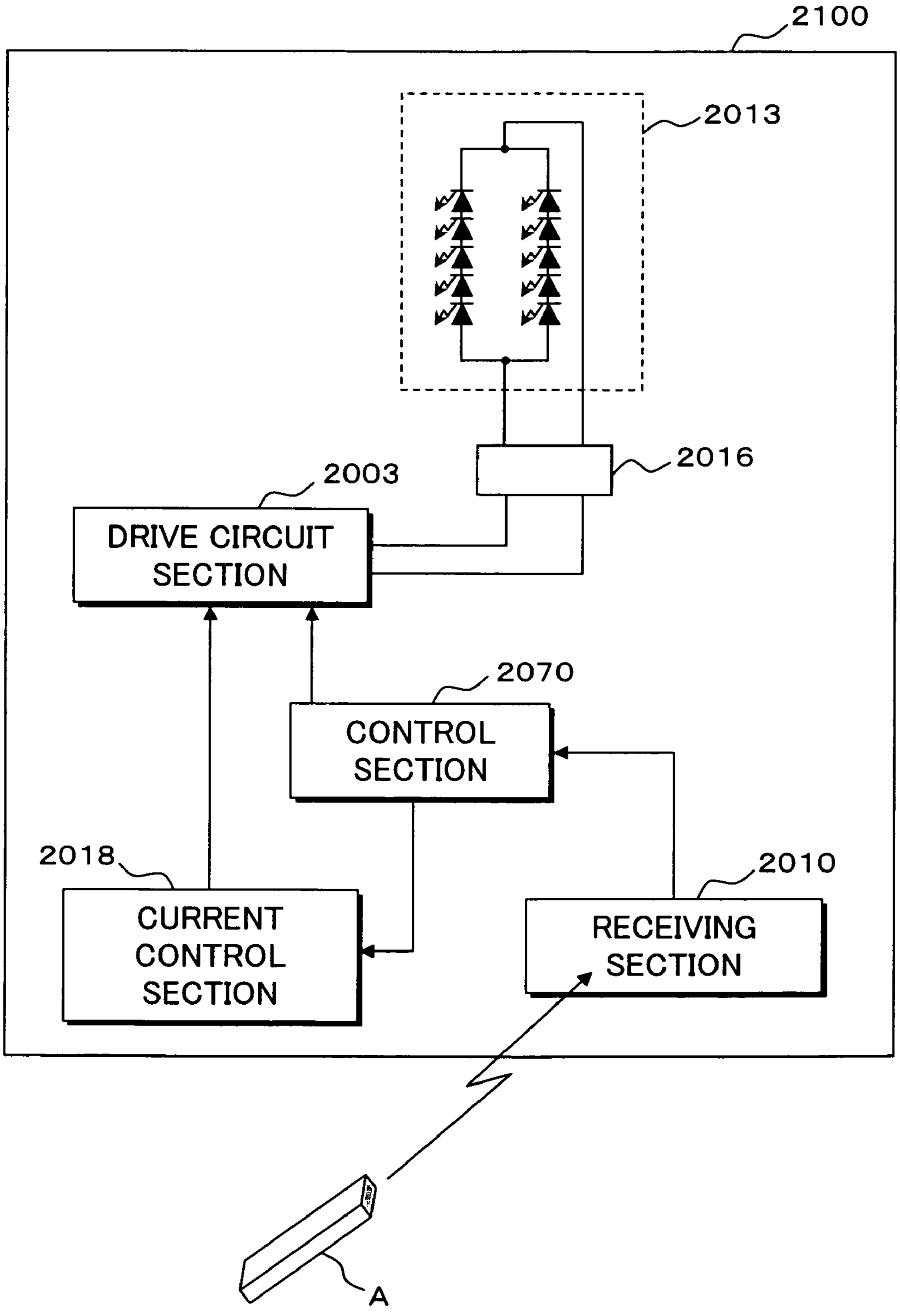
FIG. 24 is a block diagram describing a configuration of a lighting device according to Embodiment 11 of the present invention.

FIG. 24 is a block diagram describing a configuration of a lighting device 2100 according to Embodiment 11 of the present invention. The lighting device 2100 according to Embodiment 11 of the present invention is operated by remote control by a remote controller A. Here, like parts to those of Embodiments 6 to 10 are designated by like numerals, and their detailed description is omitted.

The lighting device 2100 according to Embodiment 11 has a drive circuit section 2003 connected to the LED module 2013 via the first pin plug 2016. The lighting device 2100 further has: a control section 2070 controlling the drive circuit section 2003; a current control section 2018 increasing/reducing and turning ON/OFF the current to be supplied to the white LEDs 2011, 2011, 2011, . . . of the LED module 2013 in response to an instruction from the control section 2070; and a receiving section 2010 receiving a signal from the remote controller A.

When a user operates the remote controller A, the luminance and the ON/OFF of the lighting device 2100 is operated by remote control. For example, when the user operates the remote controller A so that a signal of instruction of increasing the luminance is transmitted from the remote controller A, the receiving section 2010 receives the signal. On the basis of the signal received by the receiving section 2010, the control section 2070 instructs the current control section 2018 to control (increase) the current. Then, in response to the instruction from the control section 2070, the current control section 2018 increases the current supplied to the white LEDs 2011, 2011, 2011, . . . .

As such, Embodiment 11 of the present invention has been described for a case that the current control section 2018 is provided and on the basis of the signal from the remote controller A, the current control section 2018 controls the current supplied to the white LEDs 2011, 2011, 2011, . . . so as to adjust the luminance and the ON/OFF of the lighting device 2100. However, actual implementation is not limited to this. For example, the configuration may be such that ON/OFF control is permitted for each of the white LEDs 2011, 2011, 2011, . . . . Then, ON/OFF of each of the white LEDs 2011, 2011, 2011, . . . may be controlled independently so that the luminance and the ON/OFF of the lighting device 2100 may be adjusted.

Embodiments 6 to 11 have been described for a case that all of the light source part 2001, the heat radiating part 2002, the cover part 2004, and circuit parts 2007 are independently removable. However, all need not be removable. As long as at least one is removable, the effect of the present application is obtained that maintenance work such as component change and cleaning is performed easily. That is, for example, even in a mode that the circuit part 2007 alone is removable and that other components consisting of the light source part 2001, the heat radiating part 2002, and the cover part 2004 are formed as a unit, or alternatively even in a mode that two parts consisting of the cover part 2004 and the light source part 2001 formed as a unit are removable and that other components consisting of the heat radiating part 2002 and the circuit part 2007 are formed as a unit, maintenance work such as component change and cleaning is easily performed on the removable parts.

Here, the embodiments disclosed in the present specification should be understood as illustrative and not restrictive at all points. That is, in the present invention, various kinds of modifications and applications may be employed without departing from the range of spirit of the present invention.

The invention claimed is:

1. A lighting device, comprising:
an LED;
a drive section for driving the LED;
an accommodating part accommodating the drive section; and
a heat radiating part radiating heat from the LED and/or the drive section;
a base part to be connected to an external power supply; and
an insulating part insulating the heat radiating part from the base part,
wherein the accommodating part is tightly closed in at least a part of the heat radiating part, and
the insulating part has a heat radiating part holding cylinder holding the heat radiating part, a base part holding cylinder holding the base part and a linkage part linking the heat radiating part holding cylinder with the base part holding cylinder, wherein the heat radiating part holding cylinder, the base part holding cylinder and the linkage part are formed in one piece.

2. The lighting device according to claim 1,
wherein the accommodating part is formed by the heat radiating part and the insulating part.

3. The lighting device according to claim 2,
wherein the insulating part includes an attaching part to be attached to the heat radiating part, and
the insulating part is attached to the heat radiating part by the attaching part, thereby insulating the drive section from the heat radiating part.

4. The lighting device according to claim 3,
wherein the attaching part is a notch provided in the insulating part, and
the insulating part includes a prevention part for preventing communication between the drive section and the heat radiating part caused by the notch.

5. The lighting device according to claim 1,
wherein the heat radiating part comprises:
a heat radiation plate having one surface where the LED is mounted;
a fixed cylinder attached to the other surface of the heat radiation plate and provided with the accommodating part in an inside thereof; and
a heat radiation fin fixed to an outer side of the fixed cylinder.

6. The lighting device according to claim 1,
wherein the accommodating part forms a closed space where dust entering from the outside is shut off.

7. A lighting device, comprising:

an LED;

a drive section for driving the LED;

an accommodating part accommodating the drive section; and a heat radiating part radiating heat from the LED and/or the drive section;

a base part to be connected to an external power supply; and an insulating part insulating the heat radiating part from the base part, wherein the accommodating part is provided close to the LED inside the heat radiating part, and the insulating part has a heat radiating part holding cylinder holding the heat radiating part, a base part holding cylinder holding the base part and a linkage part linking the heat radiating part holding cylinder with the base part holding cylinder, wherein the heat radiating part holding cylinder, the base part holding cylinder and the linkage part are formed in one piece.

8. The lighting device according to claim 7, wherein the accommodating part is formed by the heat radiating part and the insulating part.

9. The lighting device according to claim 8, wherein the insulating part includes an attaching part to be attached to the heat radiating part, and the insulating part is attached to the heat radiating part by the attaching part, thereby insulating the drive section from the heat radiating part.

10. The lighting device according to claim 9, wherein the attaching part is a notch provided in the insulating part, and the insulating part includes a prevention part for preventing communication between the drive section and the heat radiating part caused by the notch.

11. The lighting device according to claim 7, wherein the heat radiating part comprises:

a heat radiation plate having one surface where the LED is mounted;

a fixed cylinder attached to the other surface of the heat radiation plate and provided with the accommodating part in an inside thereof; and a heat radiation fin fixed to an outer side of the fixed cylinder.

12. The lighting device according to claim 7, wherein the accommodating part forms a closed space where dust entering from the outside is shut off.

* * * * *